United States Patent
Zhou et al.

(10) Patent No.: US 12,457,067 B2
(45) Date of Patent: Oct. 28, 2025

(54) BEAM UPDATE PROCEDURE WITH COMPONENT CARRIER CONFIGURATION

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/905,631

(22) PCT Filed: May 7, 2021

(86) PCT No.: PCT/CN2021/092050
§ 371 (c)(1),
(2) Date: Sep. 2, 2022

(87) PCT Pub. No.: WO2021/223730
PCT Pub. Date: Nov. 11, 2021

(65) Prior Publication Data
US 2023/0140056 A1   May 4, 2023

(30) Foreign Application Priority Data
May 8, 2020   (WO) ................ PCT/CN2020/089188

(51) Int. Cl.
*H04W 4/00*   (2018.01)
*H04B 7/06*   (2006.01)
*H04L 5/00*   (2006.01)

(52) U.S. Cl.
CPC ............ *H04L 5/001* (2013.01); *H04B 7/0617* (2013.01); *H04B 7/06952* (2023.05); *H04L 5/0053* (2013.01)

(58) Field of Classification Search
CPC ...... H04L 5/001; H04L 5/0053; H04L 5/0023; H04B 7/0617; H04B 7/0695; H04B 7/088; H04B 7/0619
See application file for complete search history.

(56) References Cited

U.S. PATENT DOCUMENTS

2019/0159136 A1   5/2019   Molavianjazi et al.
2019/0349059 A1   11/2019  John Wilson et al.
(Continued)

FOREIGN PATENT DOCUMENTS

CN   110536423 A    12/2019
WO   2020056180 A1   3/2020

OTHER PUBLICATIONS

Huawei, et al., "Feature Summary of Enhancements on Multi-TRP/Panel Transmission", 3GPP TSG RAN WG1 Meeting #99, R1-1913299, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 25, 2019, XP051830596, 88 pages, Section 4.3.
(Continued)

*Primary Examiner* — Thai Dinh Hoang
(74) *Attorney, Agent, or Firm* — ArentFox Schiff LLP

(57) ABSTRACT

A UE may receive, from a base station, information indicating a set of beams associated with a plurality of CCs. The UE may be configured to activate the set of beams on the plurality of CCs either for a single TRP or for multiple TRPs, with the set of beams being activated for the single TRP when less than two beam IDs respectively associated with the set of beams are mapped to a codepoint and less than two pool indexes are configured for a CORESET associated with at least one CC of the plurality of CCs. The set of beams may be activated for the multiple TRPs when at least one of: the codepoint is mapped to two or more beam IDs, or the
(Continued)

CORESET either is configured with two or more pool indexes or is not configured with a pool index.

26 Claims, 8 Drawing Sheets

(56) References Cited

U.S. PATENT DOCUMENTS

2020/0059286 A1  2/2020  Xiong et al.
2020/0106645 A1  4/2020  Tsai et al.
2020/0113010 A1  4/2020  John Wilson et al.

OTHER PUBLICATIONS

Samsung: "Offline Discussion 112 : EMIMO MAC Corrections", 3GPP Draft, 3GPP TSG-RAN2 Meeting #109bis Electronic, R2-2003891, 3rd Generation Partnership Project, Mobile Competence Centre, 650, Route Des Lucioles, F-06921 Sophia-Antipolis Cedex, France, vol. RAN WG2, No. Electronic, Apr. 20, 2020-Apr. 24, 2020, May 1, 2020, XP051879258, 24 pages, Sections 2.10.3 and 2.10.4.
Supplementary European Search Report—EP21800122—Search Authority—Munich—May 6, 2024.
Apple Inc: "Remaining Issues on Multi-beam Operation", 3GPP TSG RAN WG1 #99, R1-1912824, Reno, USA, Nov. 18-22, 2019, Nov. 22, 2019 (Nov. 22, 2019) Section 1, 14 Pages.
International Search Report and Written Opinion—PCT/CN2021/092050—ISA/EPO—Aug. 6, 2021.
International Search Report and Written Opinion—PCT/CN2020/089188—ISA/EPO—Feb. 8, 2021.
Qualcomm Incorporated: "Correction on New DL MIMO MAC CE," 3GPP Draft, 3GPP TSG-RAN WG2 Meeting #109bis-e, R2-2003252, 3rd Generation Partnership Project (3GPP), Mobile Competence Centre, 650, Route Des Lucioles, F-06921, Sophia-Antipolis Cedex, France, vol. RAN WG2, No. Online Meeting, Apr. 20, 2020-Apr. 30, 2020, Apr. 10, 2020 (Apr. 10, 2020), XP051871250, 9 pages, Retrieved from the Internet: URL: https://ftp.3gpp.org/tsg_ran/WG2_RL2/TSGR2_109bis-e/Docs/R2-2003252.zipR2-2S03252 Correction on new DL MIMO MAC CE v2.docx- [retrieved on Apr. 10, 2020] Sections 1, 2.1.
Samsung: "Offline Discussion 112 : EMIMO MAC Corrections", 3GPP TSG-RAN2 Meeting #109bis Electronic, R2-2003891, Apr. 24, 2020 (Apr. 24, 2020), 24 Pages, the whole document.
ZTE: "Further Details on Multi-Beam/TRP Operation", 3GPP Draft, 3GPP TSG RAN WG1 Meeting #99, R1-1911933,. 3rd Generation Partnership Project (3GPP), Mobile Competence Centre, 650, Route Des Lucioles, F-06921 Sophia-Antipolis Cedex, France, vol. RAN WG1, No. Reno. US, Nov. 18, 2019-Nov. 22, 2019 Nov. 9, 2019 (Nov. 9, 2019), XP051823114, 10 Pages, Retrieved from the Internet: URL: https://ftp.3gpp.org/tsg_ran/WG1_RL1/TSGR1_99/Docs/R1-1911933.zip. R1-1911933 Further Details on Multi-Beam and TRP Operation.doc [retrieved on Nov. 9, 2019] 2.3.2 Panel-Specific UL Power Control.

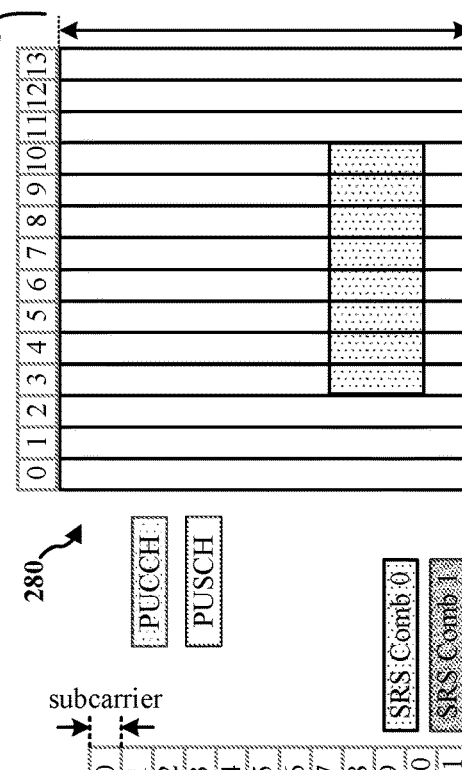
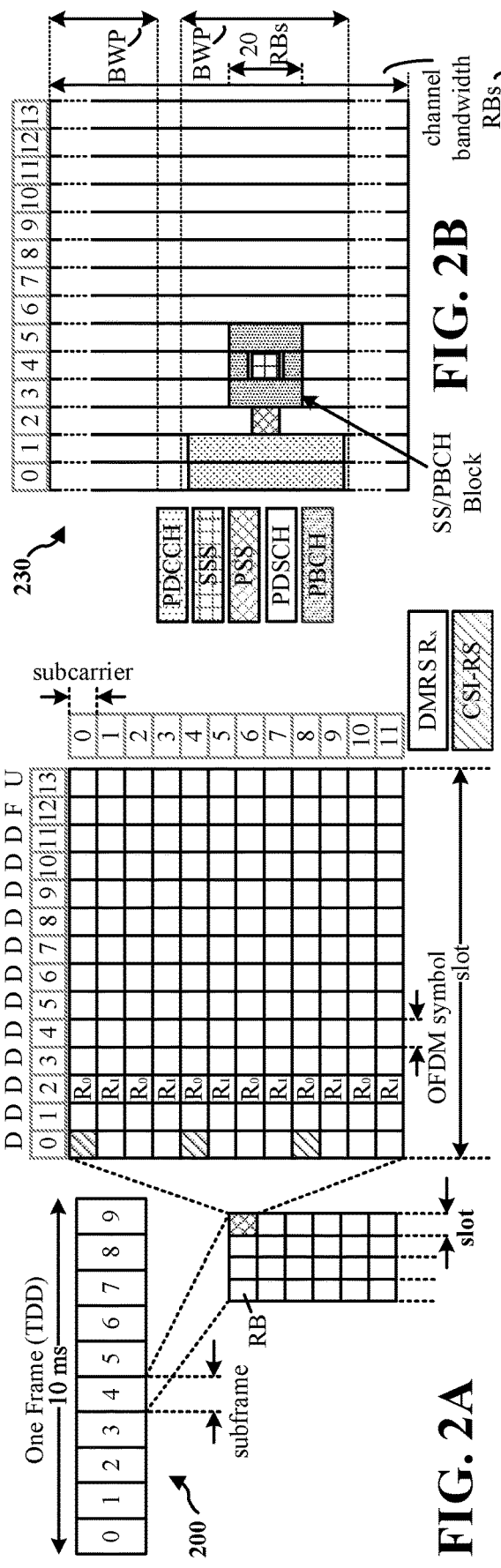
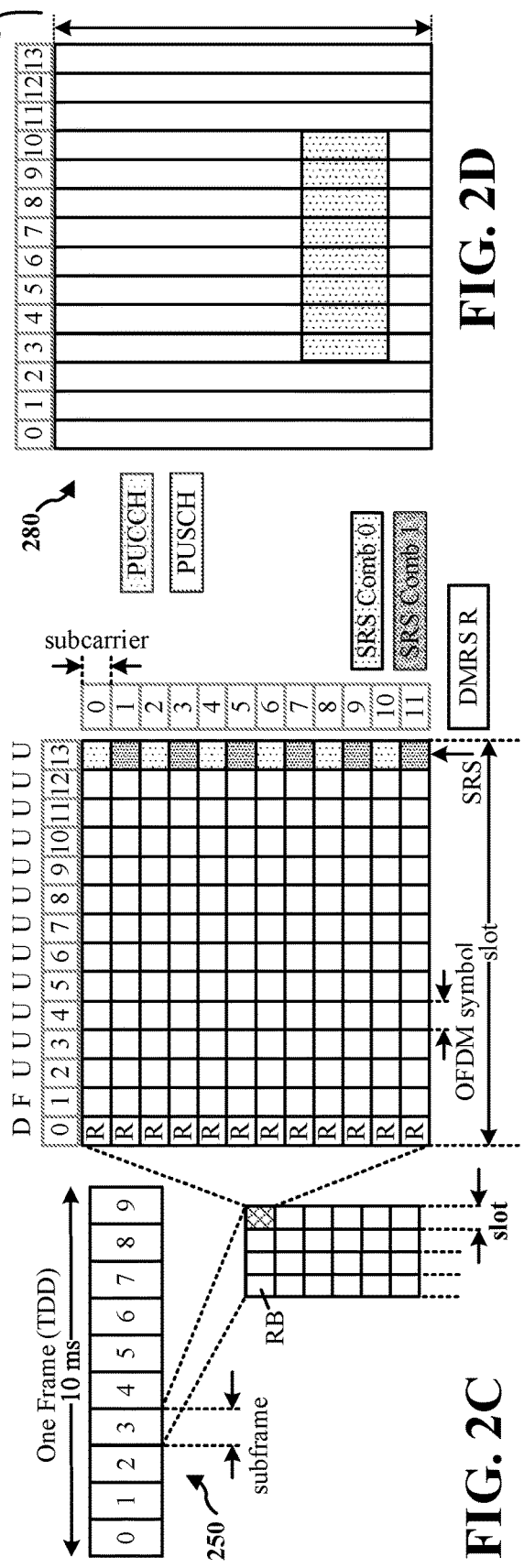

BEAM UPDATE PROCEDURE WITH COMPONENT CARRIER CONFIGURATION

CROSS REFERENCE TO RELATED APPLICATION(S)

This application is a National Phase entry of PCT Application No. PCT/CN2021/092050, entitled "BEAM UPDATE PROCEDURE WITH COMPONENT CARRIER CONFIGURATION" and filed on May 7, 2021, which claims priority of PCT Application No. PCT/CN2020/089188, entitled "SYSTEM AND METHOD FOR GROUP COMPONENT CARRIER-BASED BEAM UPDATE" and filed on May 8, 2020, both of which are expressly incorporated by reference herein in their entirety.

BACKGROUND

Technical Field

The present disclosure generally relates to communication systems, and more particularly, to a procedure for beam management with a user equipment (UE) on a set of component carriers (CCs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example radio access technology (RAT), such as 5G New Radio (NR), a user equipment (UE) and a base station (e.g., a gNB) may have the capabilities to communicate on more than one component carrier (CC), and potentially simultaneously. For example, the gNB may assign a group of CCs to the UE for carrier aggregation, which may increase the data rate for the UE. The gNB may configure the group of CCs to carry some downlink communication (e.g., downlink control information and/or downlink data) and/or some uplink communication.

Potentially, the example RAT may include more than one transmission-reception point (TRP). A TRP may be another cell, such as a secondary cell (SCell), that is different from the gNB-provided cell, which may be a primary cell (PCell). For example, a TRP may be a pico cell, femtocell, remote radio head, or cell connected to the radio access network (RAN) that includes the gNB. Potentially, a TRP may be included in a cell of the base station—e.g., a TRP may effectively function as an antenna panel for a base station. In many instances, a TRP may be configured to provide at least one CC to a UE. A set of CCs assigned to a UE may be configured through a single TRP (sTRP) or multiple TRPs (mTRP).

The UE and the gNB may communicate on CCs using directional beamforming. However, mTRP configured for the UE may affect directional beamforming for the UE, while sTRP may cause the UE to sacrifice some throughput rate and/or reliability relative to mTRP. For example, the UE may use different beams for communicating with different ones of mTRP, which may increase throughput and/or reliability, but may interfere with one another, may be appreciably expensive in terms of power and/or processing overhead, etc. Accordingly, a need exists for TRP management with a UE for communication on a group of CCs.

The present disclosure describes various techniques and solutions for applying (e.g., updating) a beam by a UE for communicating with sTRP or mTRP on at least one CC. In particular, the present disclosure describes various approaches to determining whether to apply one beam to a group of CCs for communication with sTRP or mTRP. For example, the UE may determine whether communication on a group of CCs is configured through a sTRP or mTRP, and the UE may determine whether to apply the beam to a group of CCs or a single CC based on whether the communication is configured through sTRP or mTRP.

In a first aspect of the disclosure, a first method, a first computer-readable medium, and a first apparatus are provided. The first apparatus may be a UE or component thereof configured to receive information indicating a set of beams associated with a plurality of CCs. The first apparatus may be further configured to activate the set of beams on the plurality of CCs either for a sTRP or for mTRP, the set of beams being activated for the sTRP when less than two beam identifiers (IDs) respectively associated with the set of beams are mapped to a codepoint and less than two pool indexes are configured for a control resource set (CORESET) associated with at least one CC of the plurality of CCs.

In a second aspect of the disclosure, a second method, a second computer-readable medium, and a second apparatus are provided. The second apparatus may be a base station or component thereof that may configure a set of beams on a plurality of CCs either for sTRP or for mTRP, the set of beams being configured for the sTRP when less than two beam IDs respectively associated with the set of beams are mapped to a codepoint and less than two pool indexes are configured for a CORESET associated with at least one CC of the plurality of CCs. The second apparatus may be further configured to transmit, to a UE, information indicating the set of beams associated with the plurality of CCs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
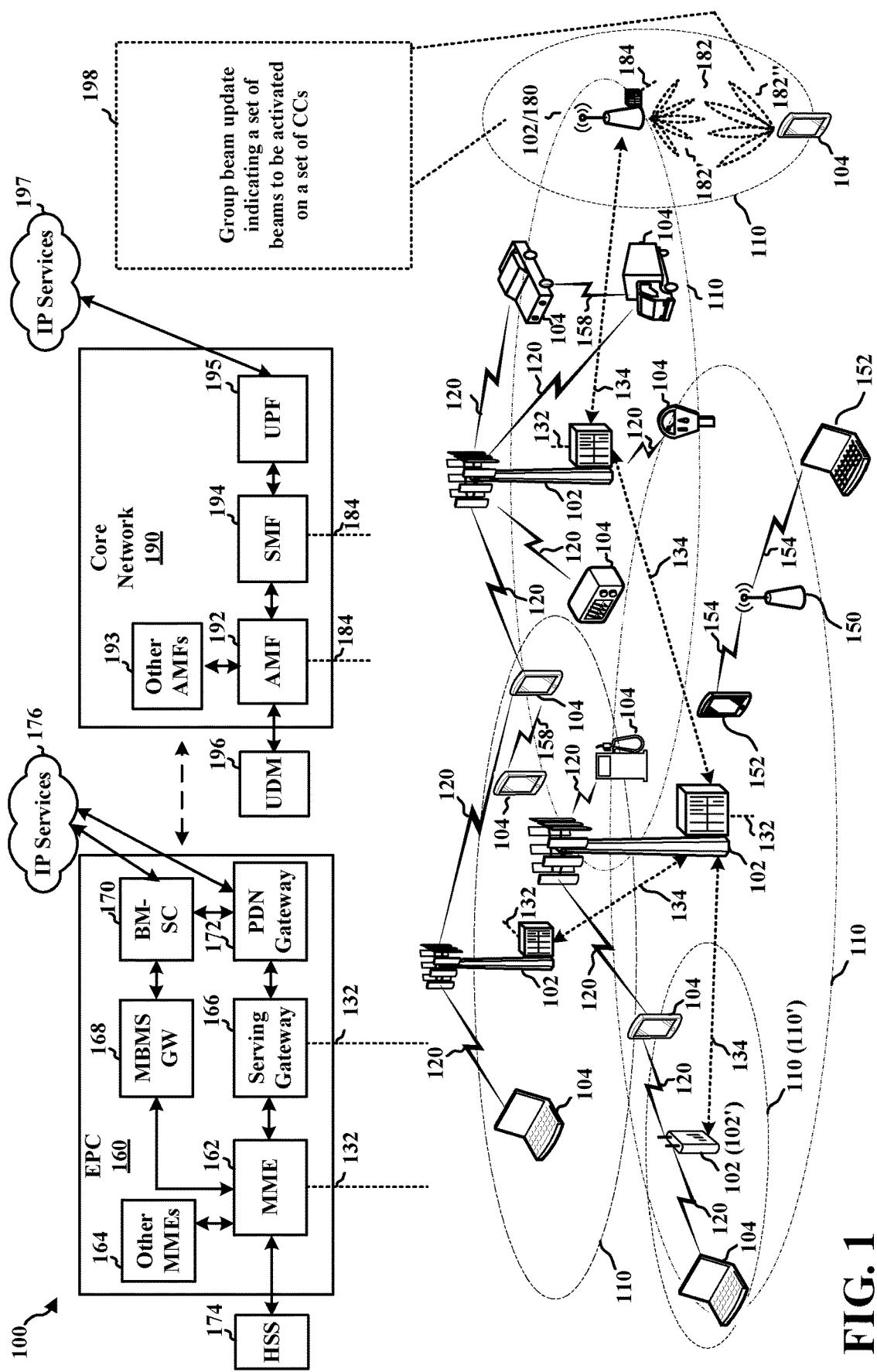
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those of ordinary skill in the art will recognize that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In various aspects of the present disclosure, a user equipment (UE) and a base station (e.g., a gNB) may be able to communicate on more than one component carrier (CC) in an example radio access network (RAN), such as a 5G New Radio (NR) RAN. For example, the base station may assign a group of CCs to the user equipment (UE) for carrier aggregation, which may increase the data rate and/or reliability for the UE. The base station may configure the group of CCs to carry some downlink communication (e.g., downlink control information and/or downlink data) and/or some uplink communication.

Potentially, the example radio access technology (RAT) may support more than one transmission-reception point (TRP) to transmit and/or receive on a group of CCs configured for a UE. A TRP may be a cell—e.g., a secondary cell (SCell) different from a primary cell (PCell) provided by a gNB. For example, a TRP may be a pico cell, femtocell, remote radio head (RRH), smart radio head, central unit (CU), distributed unit (DU), radio unit (RU), and/or a remote unit, some or all of which may be collocated or distributed and/or may communicate with one another, or other cell or carrier connected to the radio access network (RAN) that includes the gNB. Potentially, a TRP may be included in a cell of the base station—e.g., a TRP may effectively function as an antenna panel for a base station and, in some instances, communicate on the same CC(s). In many instances, a TRP may be configured to provide at least one CC to a UE. A set of CCs assigned to a UE may be configured through a single TRP (sTRP) or multiple TRPs (mTRP).

A UE may communicate on a set of CCs using directional beamforming, for example, according to a configuration provided by a base station (e.g., gNB). However, mTRP configured for the UE may affect directional beamforming for the UE, while sTRP may cause the UE to sacrifice some throughput rate and/or reliability relative to mTRP. For example, the UE may use different beams for communicating with different ones of mTRP, which may increase throughput and/or reliability, but may interfere with one another, may be appreciably expensive in terms of power and/or processing overhead, etc. Accordingly, a need exists for TRP management with a UE for communication on a group of CCs.

The present disclosure describes various techniques and solutions for applying (e.g., updating) a beam by a UE for communicating with sTRP or mTRP on at least one CC. In particular, the present disclosure describes various approaches to determining whether to activate one or more beams on a group of CCs for sTRP or mTRP. The UE may determine whether communication on the group of CCs is configured through sTRP or mTRP, and the UE may determine whether to activate the beam for communication with sTRP or mTRP on one or more than one CCs of the group.

In a first aspect of the disclosure, a first method, a first computer-readable medium, and a first apparatus are provided. The first apparatus may be a UE or component thereof configured to receive information indicating a set of beams associated with a plurality of CCs. The first apparatus may be further configured to activate the set of beams on the plurality of CCs either for a sTRP or for mTRP, the set of beams being activated for the sTRP when less than two beam identifiers (IDs) respectively associated with the set of beams are mapped to a codepoint and less than two pool indexes are configured for a control resource set (CORESET) associated with at least one CC of the plurality of CCs.

In a second aspect of the disclosure, a second method, a second computer-readable medium, and a second apparatus are provided. The second apparatus may be a base station or component thereof that may configure a set of beams on a plurality of CCs either for sTRP or for mTRP, the set of beams being configured for the sTRP when less than two beam IDs respectively associated with the set of beams are mapped to a codepoint and less than two pool indexes are configured for a CORESET associated with at least one CC of the plurality of CCs. The second apparatus may be further configured to transmit, to a UE, information indicating the set of beams associated with the plurality of CCs.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR, which may be collectively referred to as Next Generation RAN (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a CU, a DU, an RU, an RRH, and/or a remote unit, one or more of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and a secondary CC may be referred to as a secondary cell (SCell). The PCell may also be referred to as a serving cell when the UE is known both to a base station at the access network level and to at least one core network entity (e.g., AMF and/or MME) at the core network level, and the UE is configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz" or the like, if used herein, may broadly represent frequencies that may be less than 6 GHz, may be within FR1, or may include mid-band frequencies. Further, unless specifically stated otherwise, the term "millimeter wave" or the like, if used herein, may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a TRP (although some aspects of a TRP may not include the complete circuitry of a base station), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104 may be configured to receive, from a base station 102/180, information indicating a set of beams associated with a plurality of CCs. The UE 104 may be further configured to activate the set of beams on the plurality of CCs either for a sTRP or for mTRP, the set of beams being activated for the sTRP when less than two beam IDs respectively associated with the set of beams are mapped to a codepoint and less than two pool indexes are configured for a CORESET associated with at least one CC of the plurality of CCs. The information indicating the set of beams associated with the plurality of CCs may be a group beam update 198. The group beam update 198 may indicate a set of beams to be activated on a plurality of CCs for the UE 104.

In some aspects, the set of beams may be activated for the mTRP when at least one of: the codepoint is mapped to two or more beam IDs, or the CORESET either is configured with two or more pool indexes or is not configured with a pool index.

The base station 102/180, on the other hand, may configure a set of beams on the plurality of CCs either for sTRP or for mTRP, the set of beams being configured for the sTRP when less than two beam IDs respectively associated with the set of beams are mapped to a codepoint and less than two pool indexes are configured for a CORESET associated with at least one CC of the plurality of CCs. The base station 102/180 may be further configured to transmit, to the UE 104, information indicating the set of beams associated with the plurality of CCs. For example, the base station 102/180 may transmit the group beam update 198 to the UE 104, e.g., to instruct the UE 104 which beams are to be used for communication on which CCs.

Various aspects of beam management for a UE with sTRP, mTRP, and combinations thereof are further described herein. The various aspects may be implemented in various wireless and/or access networks to benefit carrier aggregation and other operations occurring on multiple CCs.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP)

orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a CORESET. Additional BWPs may be located at greater and/or lower frequencies across the channel bandwidth. A primary synchronization signal (PSS) may be within symbol 2 of particular subframes of a frame. The PSS is used by a UE to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
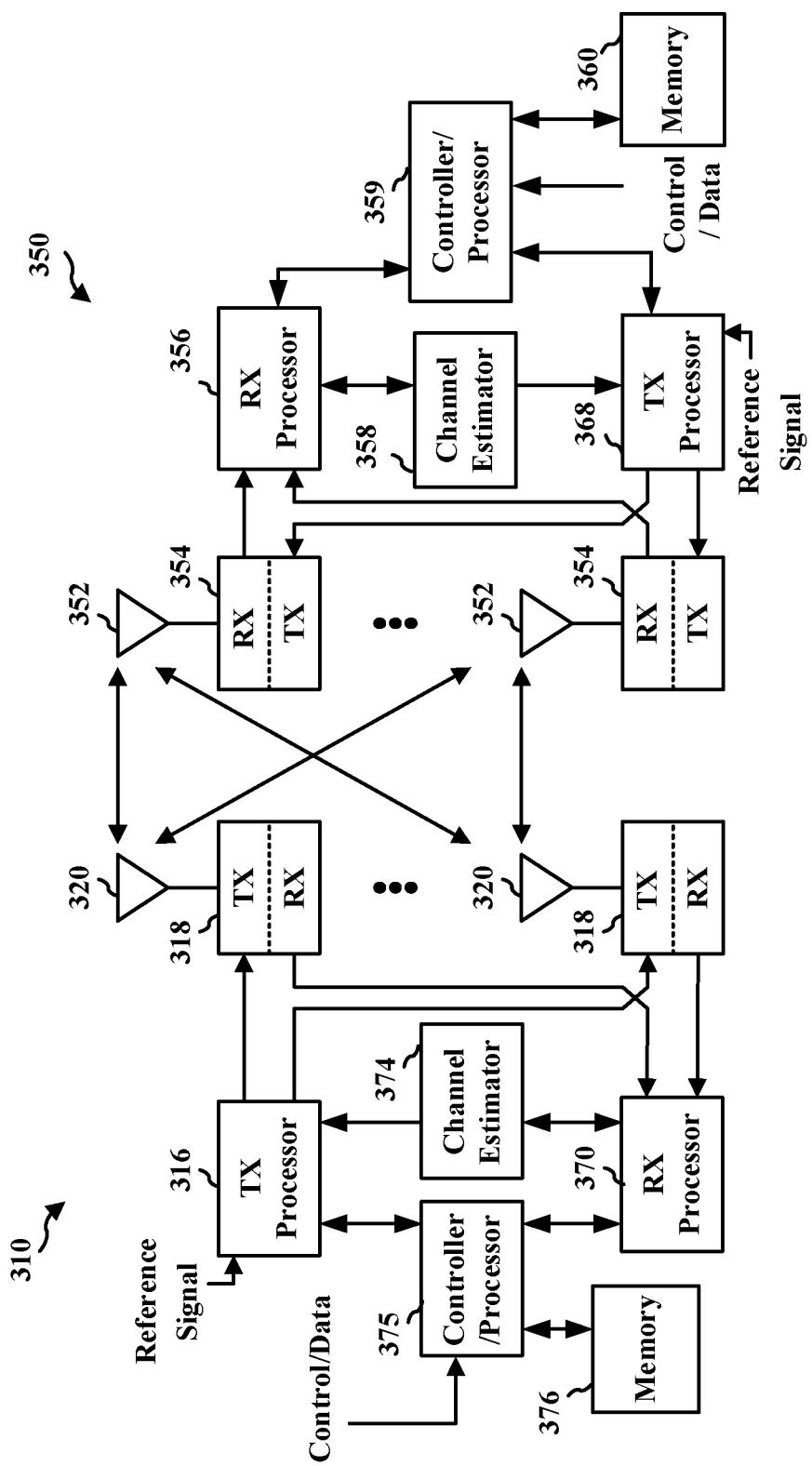
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through a respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through a respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the group beam update 198 of FIG. 1.

In some other aspects, at least one of the TX processor 316, the RX processor 370, and the controller/processor 375 may be configured to perform aspects in connection with the group beam update 198 of FIG. 1.

Figure 4:
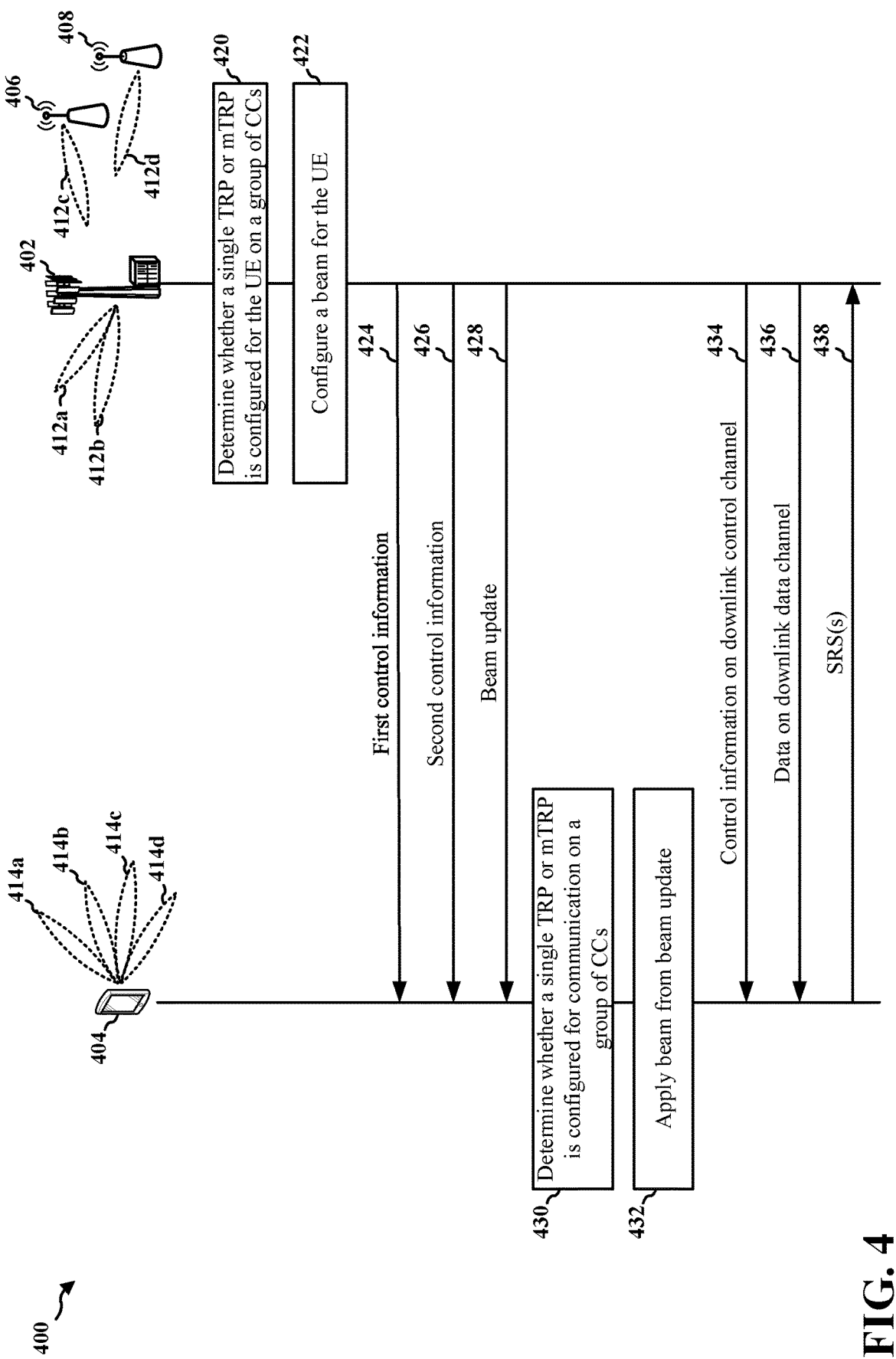
FIG. 4 is a call flow diagram illustrating an example flow of communication and operations for beam management with a UE on at least one component carrier (CC) in a wireless communications system including at least one transmission reception point (TRP).

FIG. 4 is a call flow diagram illustrating example operations in an example access network 400. The example access network 400 may include a base station 402 (e.g., gNB) and a UE 404. The base station 402 may provide a serving cell and/or PCell on which the UE 404 operates. According to various aspects, the base station 402 may assign a group of CCs to the UE 404. For example, the base station 402 may assign a group of CCs to the UE 404 by transmitting an applicable list of CCs to the UE 404 via RRC signaling.

The access network 400 may further include a set of TRPs 406, 408, each of which may be a pico cell, femtocell, RRH, smart radio head, CU, DU, RU, and/or remote unit, some or all of which may be collocated or distributed and/or may communicate with one another, or other cell or carrier connected to the access network 400 that includes a gNB (e.g., the base station 402). Potentially, a TRP may be included in a cell of the base station—e.g., a TRP may effectively function as an antenna panel for a base station and, in some instances, communicate on the same CC(s). In many instances, a TRP may be configured to provide at least one CC to a UE. A set of CCs assigned to a UE may be configured through sTRP or mTRP.

While the base station 402 may be a TRP, the base station 402 may provide a PCell and/or serving cell, whereas each of the TRPs 406, 408 may be configurable as an SCell for the UE 404. For example, the base station 402 may be capable of configuring one or more of the group of CCs assigned to the UE 404 through one or more of the TRPs 406, 408.

In some aspects, each CC in the group of CCs may include BWPs, such as downlink BWPs. One or multiple (e.g., all) of the CCs may be configured with a corresponding CORE-SET, e.g., on which some DCI for the corresponding CC(s) may be carried. The CCs may be assigned for carrier aggregation, which may be intra-band carrier aggregation and/or, if supported, inter-band carrier aggregation.

In some other aspects, the base station 402 may assign the group of CCs to the UE 404 for uplink communication. The base station 402 may assign a group of CCs—e.g., the base station 402 may activate a BWP—according to a certain band configuration, some of which may be TDD (e.g., n30, n41, etc.), and others of which may be FDD (e.g., n3, n8, etc.). The UE 404 may transmit SRSs on the group of CCs (see, e.g., FIG. 2C). The UE 404 may transmit SRSs aperiodically and/or semi-periodically.

The UE 404 and the base station 402 may communicate on CCs using directional beamforming—e.g., the UE 404 may generate beams 414a-d that may be paired with beams 412a, 412b generated by the base station 402 and/or one or more beams 412c, 412d respectively generated by the one or more TRPs 406, 408. The base station 402 may configure the beams used by the UE 404. For example, the base station 402 may transmit information to the UE 404 that indicates a beam (e.g., beam identifier and/or beam index) to be applied (e.g., activated, updated, etc.) by the UE 404.

In some aspects, the base station 402 may indicate one of the beams 412a-d to be paired with one of the UE beams 414a-d at the UE 404 for downlink communication by indicating a transmission configuration indication (TCI) state identifier (ID), which may be interpreted as and/or may correspond to a beam ID. The base station 402 may configure different TCI state IDs for the UE 404 for different types of communication. For example, the base station 402 may configure a respective TCI state ID for each CORESET corresponding to each CC/BWP configured for the UE 404. The base station 402 may indicate a TCI state ID in a MAC control element (CE) and/or in at least one RRC message.

In some other aspects, the base station 402 may indicate one of the beams 412a-d to be paired with one of the UE beams 414a-d and applied by the UE 404 for uplink communication by setting a value of a Spatial Relation Info field (e.g., an information element labeled "spatialRelationInfo"). The UE 404 may use the value of the Spatial Relation Info field to determine a corresponding one of the beams 414a-d, such as by determining an index or ID corresponding to the indicated one of the beams 414a-d.

In some aspects, the base station 402 may configure one beam for all of the group of CCs assigned to the UE 404, which may be referred to as a group CC-based beam update. For example, the base station 402 may set a value in a MAC CE or information element that indicates a TCI state ID or spatial relation information for a first CC, and the base station 402 may indicate that value of the TCI state ID or Spatial Relation Info is further applicable to each of the other CCs in the group of CCs.

Potentially, the base station 402 may configure a beam by identifying a TCI state and/or quasi-collocation (QCL) (or quasi-collocated) type, and selecting that TCI state and/or QCL type. For example, when a TCI state ID is activated for a CORESET by a MAC CE for a set of CCs/BWPs at least for the same band (the applicable list of CCs being indicated by RRC signaling), the TCI state ID may be applied for the CORESET(s) with the same CORESET ID for all BWPs in the indicated CCs on the list. The CORESET ID, which may be signaled in an information element ControlResource-SetID, may be used to identify a CORESET within a cell or CC—e.g., the CORESET ID of 0 may identify the control resource set #0 configured via PBCH (MIB) and in control-ResourceSetZero (ServingCellConfigCommon). The ID space may be used across the BWPs of a cell or CC.

In some aspects, DCI on a CORESET for at least one of the base station 402 and/or TRP(s) 406, 408 may be found via one of the beams 412a-d in association with a pool index. The UE 404 may receive such a CORESET with one of the beams 414a-d paired with the one of the beams 412a-d. A pool index may indicate a mapping between an activated TCI state (e.g., beam) and a codepoint included in DCI for a CORESET. Thus, the UE 404 may be configured with at least one pool index (e.g., configured by the base station 402), the signaling of which may be index-based such that the UE 404 is able to find and decode a CORESET.

In some examples, the base station 402 may use a single MAC CE to activate the same TCI state IDs of a downlink control channel (e.g., PDCCH) for multiple CCs/BWPs. In a further example, when a spatial relation information is activated for a semi-periodic/aperiodic SRS resource by a MAC CE for a set of CCs/BWPs at least for the same band (the applicable list of CCs being indicated by RRC signaling), the spatial relation information may be applied for the semi-periodic/aperiodic resource(s) with the same SRS resource ID for all BWPs in the indicated CCs on the list.

In some aspects, the base station 402 may indicate, to the UE 404 using the MAC CE of one message, a map of least one TCI state ID to a set of codepoints in DCI. A codepoint may be a value of a TCI field in the DCI. For example, the number of TCI state IDs configurable for the UE 404 (e.g., 128 TCI state IDs to receive the PDSCH) may exceed the capacity of a DCI message, and therefore, the base station 402 may indicate, using MAC CE of one message, that each codepoint in a DCI message corresponds to at least one respective TCI state ID. Each codepoint, however, may be capable of being mapped to two TCI state IDs, e.g., when a group of CCs are configured on mTRP.

As each of the TRPs 406, 408 may include a respective antenna array for beamforming, the UE 404 may apply different beams 412c, 412d for communicating with different ones of the TRPs 406, 408, as well as the base station 402. In other words, the UE 404 may use different ones of the beams 414a-d in order to steer communication in a direction suitable for the one of the TRPs 406, 408 or base station 402 that the UE 404 is communicating.

As the UE 404 may apply different beams for communicating with the different ones of the TRPs 406, 408, the UE 404 may be unable to apply the same beam for all CCs in a group assigned to the UE 404 when one or more of those CCs are configured through the TRPs 406, 408 different from the base station 402. In other words, the UE 404 may be configured to update a beam for a group of assigned CCs when that group of assigned CCs is configured on sTRP (e.g., the base station 402). However, the UE 404 may not be configured to update a beam for a group of assigned CCs when that group of CCs is configured on mTRP (e.g., on TRPs 406, 408).

When the base station 402 is configuring a beam for the UE 404, the base station 402 may determine whether sTRP or mTRP is configured for the UE 404 on the group of assigned CCs (420). The base station 402 may only transmit a group CC-based beam update to the UE 404 for all assigned CCs when all assigned CCs are configured on sTRP. If, however, the assigned CCs are configured on mTRP, the base station 402 may configure a respective beam for each of the CCs.

In the illustrated aspect, the base station 402 may configure group CC-based beam update for the UE 404 (422). That is, the base station 402 may configure a beam for one CC of the group of assigned CCs, and the base station 402 may configure communication on all other CCs of the group to use the same beam.

In some aspects, the base station 402 may configure the group CC-based beam update for downlink data on a downlink data channel (e.g., PDSCH). In some other aspects, the base station 402 may configure the group CC-based beam update for downlink control information on a downlink control channel (e.g., PDCCH). In still other aspects, the base station 402 may configure the group CC-based beam update for semi-periodic/aperiodic SRS transmitted by the UE 404. In yet further aspects, the base station 402 may configure the group CC-based beam update for a combination of two or more of the downlink control information, downlink data, aperiodic SRS, and/or semi-periodic SRS.

In order for the group of CCs to be configured on sTRP, CORESET pool indexes for each of the set of CORESET may be configured with less than two indexes (e.g., one index or no indexes). In some further aspects, each of a set of codepoints (e.g., mapped to TCI state IDs corresponding with beams, as indicated by DCI) may correspond with (e.g., map to) less than two TCI state IDs (e.g., a mapping included in a MAC CE for the UE 404 may map each of a set of codepoints indicated therein to zero or one TCI state IDs).

Further, the base station 402 may configure, for the UE 404, each of a set of codepoints that map to a respective TCI state ID in DCI. As the base station 402 may configure a group CC-based beam update for the UE 404, the base station 402 may configure each codepoint to map to only a single TCI state ID. In some other aspects, the base station 402 may configure one or more of the codepoints to map to a respective plurality of TCI state IDs, each of which may correspond with a beam of the beams 412a-d at the base station 402 and/or mTRP 406, 408.

The base station 402 may transmit first control information 424 indicating the set of CORESET, and further, may transmit second control information 426 indicating the set of codepoints in DCI respectively associated with a single TCI state ID. In some aspects, the base station 402 may transmit the first control information 424 via RRC signaling and may transmit the second control information 426 in at least one MAC CE.

Further, the base station 402 may transmit the group CC-based beam update 428 to the UE 404. In some aspects, the group CC-based beam update 428 may be included in at least one MAC CE and/or in an RRC message.

The UE 404 may receive the first control information 424 (e.g., via RRC signaling) and the second control information 426 (e.g., in at least one MAC CE). Based thereon, the UE 404 may determine whether a single TRP or mTRP is configured for the communication on the group of assigned CCs (430). The UE 404 may determine that the first control information 424 indicates less than two pool indexes (i.e., zero or one indexes) associated with a CORESET for all of the set of CORESET configured in the CCs/BWPs assigned to the UE 404. For example, all of CORESETs to the UE 404 can be configured with a same value of CORESET pool index. In another example, all or some of CORESETs to the UE 404 can be configured with no CORESET pool indexes. The UE 404 may also determine that the second control information 426 indicates each of the set of codepoints in DCI maps to a respective single TCI state ID. In some aspects, each of the TCI state IDs may correspond with a beam of a set of beams for communicating on the CCs, and one codepoint may be mapped to a subset of the set of beams, with each subset including less than two beams (i.e., less than two TCI state IDs) if sTRP is configured for communication on the assigned CCs.

If either of the two aforementioned conditions fails, then the UE 404 may determine that the group of CCs is configured on mTRP. That is, the UE 404 may determine that the group of CCs is configured on mTRP when the first control information 424 indicates two or more pool indexes associated with the CORESET of the set of CORESET and/or the second control information 426 indicates at least one of the set of codepoints is mapped with more than one (e.g., two) TCI state IDs included in DCI. For example, each of the TCI state IDs may correspond with a beam of a set of beams for communicating on the CCs, with one codepoint being mapped to a subset of the set of beams including two or more beams (i.e., two or more TCI state IDs) if mTRP is configured for communication on the assigned CCs.

The UE 404 may further receive the group CC-based beam update 428. The UE 404 may determine that the group of CCs is assigned on the single TRP, and therefore, the UE 404 may apply the beam for each CC of the group of assigned CCs (432).

In a first aspect, the group CC-based beam update 428 may configure a beam for downlink control information on a downlink control channel (e.g., PDCCH). In such aspects, if the UE 404 is provided by simultaneousTCI-CellList a number of up to two lists of cells for simultaneous TCI state activation by simultaneousTCI-UpdateList-r16 and/or simultaneousTCI-UpdateListSecond-r16, the UE 404 applies the antenna port quasi co-location provided by TCI-States with same activated tci-StateID value to CORESETs with index p in all configured DL BWPs of all configured cells in a list determined from a serving cell index provided by a MAC CE command. The simultaneousTCI-CellList can be provided for simultaneous TCI state activation only if the UE 404 is not provided different values of CORESETPoolIndex in ControlResourceSets, and is not provided at least one TCI codepoint mapped with two TCI states.

Further to the first aspect, when the UE 404 has applied the beam for the group of assigned CCs on the downlink control channel (e.g., PDCCH), the UE 404 may receive downlink control information 434 on the downlink control channel via the one of the beams 414a-d activated by the group CC-based beam update 428.

In a second aspect, the group CC-based beam update 428 may configure a beam for downlink data on a downlink data channel (e.g., PDSCH). In such aspects, the UE 404 may receive the group CC-based beam update 428 as an activation command used to map up to eight TCI states to the codepoints of the DCI field "Transmission Configuration Indication" in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs. A set of TCI state IDs can be activated for a set of CCs/DL BWPs only if the UE 404 is not provided different values of CORESETPoolIndex in ControlResourceSets, and is not provided at least one TCI codepoint mapped with two TCI states.

Further to the second aspect, when the UE 404 has applied the beam for the group of assigned CCs on the downlink data channel (e.g., PDSCH), the UE 404 may receive downlink data 436 on the downlink data channel via the one of the beams 414*a-d* activated by the group CC-based beam update 428.

In a third aspect, the group CC-based beam update 428 may configure a beam for semi-periodic/aperiodic SRS. In such aspects, when a spatialRelationInfo is activated/updated for a semi-persistent or aperiodic SRS resource configured by the higher layer parameter SRS-Resource by a MAC CE for a set of CCs/BWPs, where the applicable list of CCs is indicated by higher layer parameter simultaneousSpatial-UpdatedList-r16 or simultaneousSpatial-UpdatedListSecond-r16, the spatialRelationInfo is applied for the semi-persistent or aperiodic SRS resource(s) with the same SRS resource ID for all the BWPs in the indicated CCs. A spatialRelationInfo can be activated/updated for a semi-persistent or aperiodic SRS resource configured by the higher layer parameter SRS-Resource by a MAC CE for a set of CCs/BWPs only if the UE 404 is not provided different values of CORESETPoolIndex in ControlResourceSets, and is not provided at least one TCI codepoint mapped with two TCI states.

Further to the third aspect, when the UE 404 has applied the beam for the group of assigned CCs, the UE 404 may transmit semi-periodic/aperiodic SRS(s) on SRS resource(s) via the one of the beams 414*a-d* activated by the group CC-based beam update 428.

Figure 5:
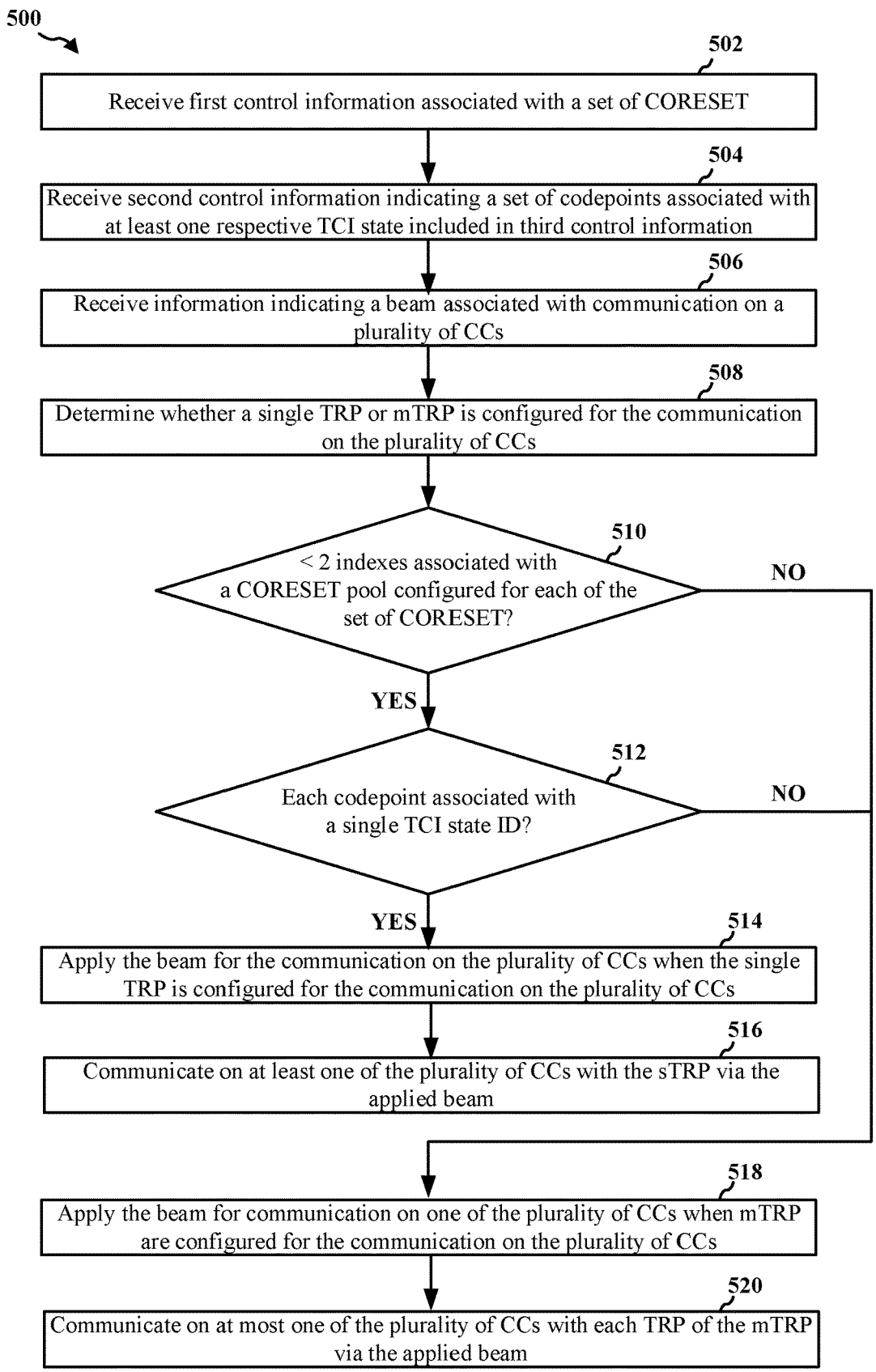
FIG. 5 is a flowchart of an example method of wireless communication by UE with at least one TRP on at least one CC.

FIG. 5 is a flowchart of an example method 500 of wireless communication. The method may be performed by a UE (e.g., the UE 104, 350, 404), an apparatus (e.g., the apparatus 702), and/or another component or device at a UE. According to different aspects, one or more of the illustrated operations may be transposed, omitted, and/or contemporaneously performed.

At 502, the UE may receive first control information associated with a CORESET. The UE may receive the first control information via RRC signaling. The first control information may indicate a number of pool indexes associated with at least one CORESET, which may be a pool of resources in which the CORESET may be found. The information associated with the CORESET may indicate zero, one, or more than one pool indexes associated with a CORESET of each CORESET of the set.

In the context of FIG. 4, for example, the UE 404 may receive the first control information 424 from the base station 402. For example, the first control information may include information identifying at least one of a CORESET ID, a BWP ID in which a CORESET may be found, and/or a CORESET pool index(es) corresponding to the CORESET ID.

At 504, the UE may receive second control information indicating a set of codepoints associated with at least one respective TCI state ID included in third control information. For example, the second control information may indicate a mapping of a set of codepoints to a set of IDs (e.g., TCI state IDs) corresponding with a set of beams. From the second control information, the UE may be able to determine the number of IDs mapped to each of the codepoints. In some aspects, one or more of the codepoints may be mapped to less than two TCI state IDs. In some other aspects, one or more of the codepoints may be mapped to two or more TCI state IDs. For example, one codepoint possibly may correspond with two (or more) TCI state IDs, and potentially, those two or more TCI state IDs may identify respective beams at two (or more) TRPs. The second control information may be received in at least one MAC CE. In some other aspects, the second control information may be received before, after, or contemporaneously with the first control information.

In the context of FIG. 4, for example, the UE 404 may receive the second control information 426 from the base station 402. The second control information 426 may indicate a mapping of a set of codepoints to a set of IDs (e.g., corresponding with a set of beams).

At 506, the UE may receive information indicating a beam associated with communication on a plurality of CCs. For example, the aforementioned first and second control information may configure the UE to receive DCI in a first set of CORESET, e.g., from sTRP or mTRP, and the UE may then receive information updating where the UE is to receive DCI, e.g., from the same or different sTRP or mTRP. In one aspect, the information indicating the beam associated with the communication on the plurality of CCs may be information indicating a set of beams associated with a set of CCs. The information may be configured by a base station for the UE, e.g., for carrier aggregation on multiple CCs provided through multiple beams. The UE may receive the information indicating the beam in DCI (e.g., on the PDCCH) or in a MAC CE. The information indicating the beam associated with communication on the plurality of CCs may be separately received from the aforementioned first and second control information.

In the context of FIG. 4, for example, the UE 404 may receive the group CC-based beam update 428 from the base station 402. The update 428 may indicate a set of one or more of the beams 412*a-d* associated with a set of CCs. For example, each of the CCs may be available through at least one of the base station 402 and/or TRP(s) 406, 408.

At 508, the UE may determine whether a single TRP or mTRP is configured for the communication on the plurality of CCs. For example, if any of the codepoints is mapped to more than one beam, then the UE may determine that mTRP are configured for the UE. Similarly, if each CORESET is configured with at most one pool index, then the UE may determine that sTRP is configured for the UE. If the UE determines either of the preceding conditions is false—i.e., if one codepoint is mapped to more than one TCI state ID and/or if one CORESET is configured with more than one pool index—then the UE may determine that mTRP are configured for the UE.

In the context of FIG. 4, for example, the UE 404 may determine whether one or both of the TRPs 406, 408 is configured for communication on a group of CCs (430). If one and not all of the TRPs 406, 408 are configured on CCs on which the UE 404 may communicate, then the UE 404 may be obligated to monitor for DCI in the CORESETs from all TRPs 406, 408. If all TRPs 406, 408 are configured on CCs on which the UE 404 may communicate, then the UE 404 may be obligated to monitor for DCI in the CORESETs from all TRPs 406, 408.

In order to determine whether the single TRP or mTRP is configured for the communication on the plurality of CCs, at 510, the UE may determine whether less than two (i.e., zero or one) pool indexes associated with a CORESET are configured for each of the set of CORESET. The UE may calculate, e.g., from the first control information, a number of pool indexes for a CORSET, and the UE may compare that number with a threshold of one (1) to determine whether the number is less than two. For example, the UE may determine whether less than two pool indexes are associated with each CORESET found on a respective one of the group of CCs. Referring to FIG. 4, the UE 404 may determine whether the first control information 424 indicates less than two pool indexes associated with a CORESET are configured for each of the set of CORESET of the CC/BWPs.

At 512, the UE may determine whether each codepoint in the second control information is associated with a single TCI state ID of third control information. For example, the UE may identify whether each codepoint in the control information maps to one TCI state ID in DCI or two TCI state IDs in DCI. The UE may calculate, e.g., from the second control information, a number of TCI state IDs to which each code point maps, and the UE may compare that number with a threshold equal to one (1) to determine whether the number of IDs to which a codepoint maps is less than two. Referring to FIG. 4, the UE 404 may determine whether the second control information 426 indicates each codepoint maps to a single TCI state ID in DCI or maps to two TCI state IDs in DCI.

If the UE determines, at 510, that less than two (i.e., zero or one) pool indexes associated with a CORESET are configured for each of the set of CORESET and, at 512, that each codepoint in the second control information maps to a single TCI state ID of third control information, then the UE may determine that sTRP is configured for the communication on the plurality of CCs. The UE may, at 514 and 516:

At 514, the UE may apply the beam for the communication on the plurality of CCs. For example, the UE may activate the set of beams for sTRP on the set of CCs based on at least one of a subset of the set of beams to which a codepoint is mapped or a number of pool indexes that are configured for a CORESET associated with at least one CC of the set of CCs. In some aspects, applying and/or activating may include, identifying at least one pilot signal that is quasi-collocated with the beam, measuring or detecting one or more parameters associated with the pilot signals, and selecting a spatial filter for the beam that steers the beam in a direction that is substantially similar to that of the QCL pilot signal. The communication on the plurality of CCs may include semi-periodic/aperiodic SRS(s), downlink data on a downlink data channel (e.g., PDSCH), or downlink control information on a downlink control channel (e.g., PDCCH).

In the context of FIG. 4, for example, the UE 404 may apply one of the beams 414a-d corresponding to the beam update 428 for receiving the downlink control information 434 on the downlink control channel, receiving the downlink data 436 on the downlink data channel, or transmitting the semi-periodic/aperiodic SRS(s) 438.

At 516, the UE may communicate on at least one of the plurality of CCs with the sTRP via the applied beam. In some aspects, the UE may receive downlink data or control information on the at least one of the plurality of CCs from the sTRP via the applied beam. For example, the UE detect signaling on the PDCCH CORESET of one of the plurality of CCs for the sTRP. The UE may decode the signaling carried thereon in order to obtain DCI, which may schedule downlink data on a PDSCH from the sTRP. The UE may then use the schedule to receive the downlink data on the PDSCH from the sTRP. In the context of FIG. 4, for example, the UE 404 may apply at least one of the beams 414a-d, corresponding to one of the beams 412a-d indicated by the beam update 428, for at least one of receiving the downlink control information 434 on the downlink control channel and/or receiving the downlink data 436 on the downlink data channel from one of the base station 402, first TRP 406, or second TRP 408.

In some other aspects, when the UE applies or activates the beam on one of the plurality of CCs for the sTRP, the UE may be configured to sound the uplink channel. Accordingly, the UE may transmit a set of SRSs on at least one of the plurality of CCs for the sTRP via the beam. In the context of FIG. 4, for example, the UE 404 may apply two of the beams 414a-d, corresponding to beam(s) 412c-d indicated by the beam update 428, for transmitting semi-periodic/aperiodic SRS(s) 438 to one of the base station 402 or TRPs 406, 408.

If the UE determines, at 510, that two or more pool indexes associated with a CORESET are configured for each of the set of CORESET and/or, at 512, that at least one codepoint in the second control information maps to more than one TCI state ID of third control information, then the UE may determine that mTRP is configured for the communication on the plurality of CCs. The UE may, at 518 and 520:

At 518, the UE may apply the beam for the communication on at most one CC of the plurality of CCs. In some aspects, applying and/or activating may include, identifying at least one pilot signal with which the beam is to be quasi-colocated, measuring or detecting one or more parameters associated with the pilot signals, and selecting a spatial filter for the beam that steers the beam in a manner substantially similar to that of the pilot signals.

In the context of FIG. 4, for example, the UE 404 may apply two of the beams 414a-d, corresponding to the beam update 428 and/or paired with the beam(s) 412c-d, for at least one of receiving the downlink control information 434 on the downlink control channel, receiving the downlink data 436 on the downlink data channel, or transmitting the semi-periodic/aperiodic SRS(s) 438.

At 520, the UE may communicate on at most one of the plurality of CCs with each TRP of the mTRP via the applied beam. In some aspects, when the UE applies or activates the beam on one of the plurality of CCs for one TRP of the mTRP, the UE may receive downlink data or control information on the one of the plurality of CCs from the one TRP of the mTRP via the applied beam. For example, the UE detect signaling on the PDCCH CORESET of one of the plurality of CCs for one TRP of the mTRP. The UE may decode the signaling carried thereon in order to obtain DCI, which may schedule downlink data on a PDSCH in the one CC associated with the one TRP. The UE may then use the schedule to receive the downlink data on the PDSCH from the one of the mTRP. In the context of FIG. 4, for example, the UE 404 may apply two of the beams 414a-d, corresponding to one or two of the base station/TRP beams 412a-d, e.g., indicated by the beam update 428, for at least one of receiving the downlink control information 434 on the downlink control channel and/or receiving the downlink data 436 on the downlink data channel from each of at least two of the base station 402, first TRP 406, or second TRP 408.

In some other aspects, when the UE applies or activates the beam on one of the plurality of CCs for the mTRP, the UE may be configured to sound the uplink channel. Accordingly, the UE may transmit a set of SRSs on at most one of the plurality of CCs for each TRP of the mTRP via the beam. In the context of FIG. 4, for example, the UE 404 may apply two of the beams 414a-d, corresponding to beams 412a-d indicated by the beam update 428, for transmitting semi-periodic/aperiodic SRS(s) 438 to each of the at least two of the base station 402, first TRP 406, or second TRP 408.

Figure 6:
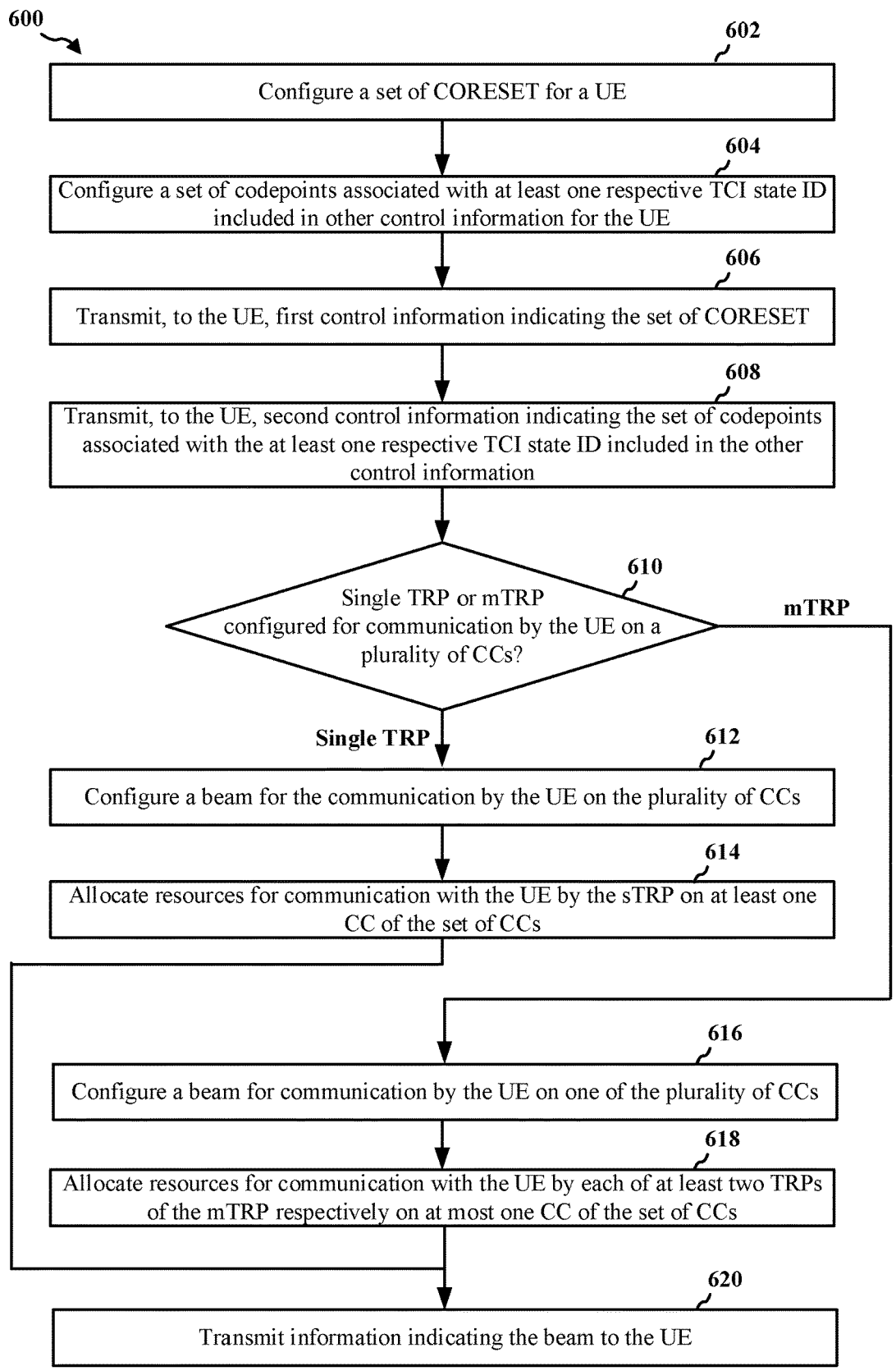
FIG. 6 is a flowchart of an example method of wireless communication by a base station for beam management of a UE configured to communicate with at least one TRP on at least one CC.

FIG. 6 is a flowchart of an example method 600 of wireless communication. The method may be performed by a base station (e.g., the base station 102/180, 310, 402), an apparatus (e.g., the apparatus 802), and/or another component or device at a UE. According to different aspects, one or more of the illustrated operations may be transposed, omitted, and/or contemporaneously performed.

At 602, the base station may configure a set of CORESET for a UE. For example, the base station may configure a respective CORESET for each CC/BWP assigned to the UE in a group of CCs. First, the base station may activate a BWP, and second, the base station may select a set of resources to carry the PDCCH. The base station may also select an aggregation level. For example, referring to FIG. 4, the base station 402 may configure a set of CORESET for the UE 404.

At 604, the base station may configure a set of codepoints associated with at least one respective TCI state ID included in other control information for the UE. For example, the base station may identify a set of TCI states that have been activated, and the base station may map an ID of each of the TCI states to a codepoint for a CORESET. For example, referring to FIG. 4, the base station 402 may configure a set of codepoints associated with at least one respective TCI state ID included in DCI for the UE 404.

At 606, the base station may transmit, to the UE, first control information indicating the set of CORESET. The first information may indicate a set of pool indexes for each of a set of CORESETs. The base station may transmit the first control information via RRC signaling. For example, referring to FIG. 4, the base station 402 may transmit the first control information 424 to the UE 404.

At 608, the base station may transmit, to the UE, second control information indicating the set of codepoints associated with the at least one respective TCI state ID included in the other control information. The base station may transmit the second control information in at least one MAC CE, and the other control information may be DCI. The second control information may indicate a respective subset of a set of beams to which each codepoint corresponds. For example, referring to FIG. 4, the base station 402 may transmit the second control information 426 to the UE 404.

At 610, the base station may determine whether a single TRP or mTRP is to be configured for communication by the UE on a plurality of CCs assigned to the UE. For example, the base station may determine if the UE supports carrier aggregation, as well as whether another TRP is available to provide a set of CCs to assign to the UE for carrier aggregation. If the base station determines that the UE does not support carrier aggregation and/or no TRPs are available to provide CCs for carrier aggregation, the base station may assign sTRP to the UE for a plurality of CCs. If sTRP is configured, then the base station may configure less than two (i.e., zero or one) pool indexes associated with a CORESET for each of the set of CORESET indicated in the first control information and, further, may configure each codepoint in the second control information to map to a single TCI state ID of activated beams.

At 612, if the single TRP is configured (at 610), the base station may configure a beam for the communication by the UE on the plurality of CCs. For example, the base station may configure a group CC-based beam update. The base station may identify a set of resources on which the CORESET may be found, and the base station may select a beam to transmit the set of resources toward the UE. In some aspects, the base station may configure the beam by identifying a plurality of candidate beams available for communication with the UE, and the base station may compare respective wireless channel measurements corresponding to two or more of the plurality of beams with one another in order to identify the best serving beam for the UE. In some other aspects, the base station may configure the beam by identifying a position or location of the UE, which may be relative to the sTRP, and then selecting a beam having a direction toward the UE position or location. Referring to FIG. 4, the base station 402 may configure at least one of the beams 412*a-d* of the base station 402 and/or TRP(s) 406, 408, which may be paired with one of the beams 414*a-d* of the UE 404, in order to communicate on the plurality of CCs (422).

At 614, if the single TRP is configured (at 610), the base station may allocate resources for communication with the UE by the sTRP on at least one CC of the plurality of CCs. For example, the base station may schedule or allocate a first set of resources on a downlink data channel to carry downlink data for the UE, and the base station may schedule or allocate a second set of resources on a downlink control channel to carry DCI that informs a UE of the scheduling of the downlink data.

Referring to FIG. 4, the base station 402 may allocate resources on the downlink control channel to carry the control information 434 on at least one CC from at least one of the base station 402 or TRP(s) 406, 408. Further, the base station 402 may allocate resources on the downlink data channel (e.g., PDSCH) to carry the downlink data 436 from at least one of the base station 402 or TRP(s) 406, 408. The control information 434 may indicate a set of resources at which the downlink data 436 may be found on the downlink data channel.

However, if mTRP is configured (at 610), then the base station may configure two or more pool indexes associated with a CORESET for at least one of the set of CORESET, and/or the base station may configure at least one codepoint in the second control information to map to two or more TCI state IDs of the other control information. Accordingly, the base station may configure one beam for each of the different CCs available through the mTRP.

At 616, if mTRP is configured (at 610), the base station may configure a beam for communication by the UE on one of the plurality of CCs. For example, the base station may configure an update for each CC of the plurality of CCs on which a respective beam may be configured, with a respective one of the plurality of CCs being available through one of the TRPs. For example, the base station may identify a set of resources on which the CORESET may be found for each CC of the set of CCs, and the base station may select a beam to transmit the set of resources toward the UE. In some aspects, the base station may configure the beam by identifying a plurality of beams at mTRP available for communication with the UE, and the base station may compare wireless channel measurements respectively corresponding to the plurality of beams in order to determine which of the plurality of beams provides the best channel quality (e.g., the highest channel measurement). The base station may select the beam having the best channel quality with which to configure the UE for communication on one CC of the plurality of CCs. In some other aspects, the base station may configure the beam by identifying a position or location of the UE, which may be relative to one TRP of the mTRP, and then selecting a beam of the one TRP having a direction toward the UE position or location.

Referring to FIG. 4, the base station 402 may configure at least one of the beams 412*a-d* of the base station 402 and/or TRP(s) 406, 408. The one of the beams 412*a-d* may be used for directional beamforming toward the UE 404. In some aspects, the one or the beams 412*a-d* may be paired with one of the beams 414*a-d* of the UE 404, in order to communicate with one of the base station 402 or TRPs 406, 408 on one of the plurality of CCs (422).

At 618, if mTRP is configured (at 610), the base station may allocate resources for communication with the UE by each of at least two TRPs of the mTRP respectively on at most one CC of the plurality of CCs. For example, the base station may schedule or allocate a first set of resources on a downlink control channel on one CC to carry first DCI of one TRP for the UE, and allocate a second set of resources on a downlink control channel on another CC to carry second DCI of another TRP for the UE. The base station may also allocate a third set of resources on a downlink data channel on the one CC to carry first downlink data of the one TRP for the UE, and allocate a fourth set of resources on a downlink data channel on the other CC to carry second downlink data of the other TRP for the UE. The first DCI may be configured to indicate a schedule of the first downlink data on the downlink control channel of the one CC, and the second DCI may be configured to indicate a schedule of the second downlink data on the downlink control channel of the other CC.

Referring to FIG. 4, the base station 402 may allocate resources on the downlink control channel to carry the control information 434 on at least one CC from at least one of the base station 402 or TRP(s) 406, 408. Further, the base station 402 may allocate resources on the downlink data channel (e.g., PDSCH) to carry the downlink data 436 from at least one of the base station 402 or TRP(s) 406, 408. The control information 434 may indicate a set of resources at which the downlink data 436 may be found on the downlink data channel.

Upon allocating resources for communication with the UE either by the sTRP on at least one CC of the plurality of CCs or by each of at least two TRPs of the mTRP on at most one CC of the plurality of CCs, the base station may, at 620:

At 620, the base station may transmit information indicating the beam to the UE. The information indicating the beam may be included in at least one MAC CE. In some aspects, the information may configure the UE for directional beamforming on one or more CCs on which a CORESET may be found. In some other aspects, the UE may sound over at least one of the CCs using the beam. For example, the UE may transmit uplink SRSs via the beam toward at least one of the base station 402 and/or TRPs 406, 408 on at least one of the CCs. For example, referring to FIG. 4, the base station 402 may transmit the beam update 428 to the UE 404.

Figure 7:
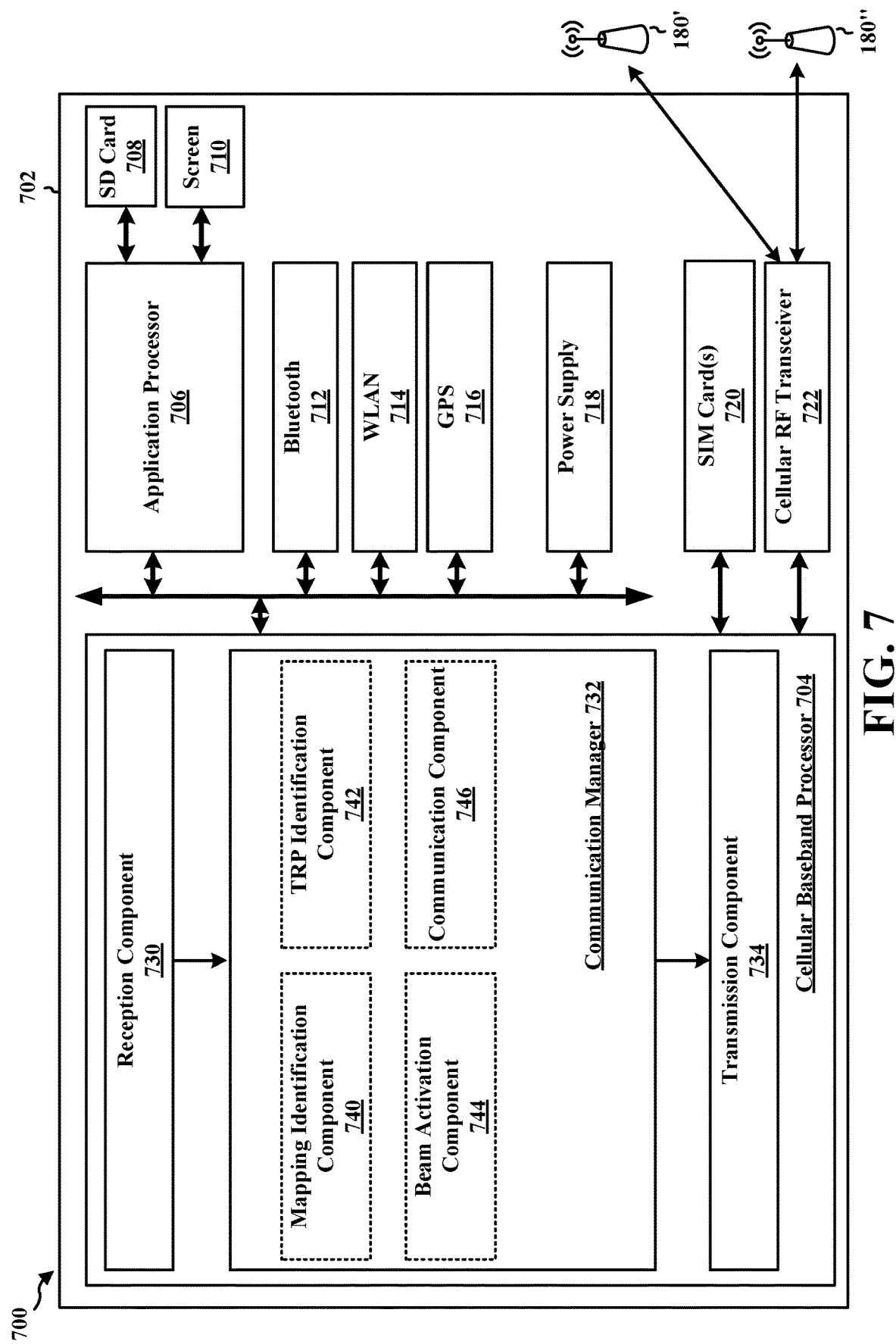
FIG. 7 is a diagram illustrating an example of a hardware implementation for an example apparatus.

FIG. 7 is a diagram 700 illustrating an example of a hardware implementation for an apparatus 702. The apparatus 702 may be a UE or similar device, or the apparatus 702 may be a component of a UE or similar device. The apparatus 702 may include a cellular baseband processor 704 (also referred to as a modem) and/or a cellular RF transceiver 722, which may be coupled together and/or integrated into the same package or module.

In some aspects, the apparatus 702 may accept or may include one or more subscriber identity modules (SIM) cards 720, which may include one or more integrated circuits, chips, or similar circuitry, and which may be removable or embedded. The one or more SIM cards 720 may carry identification and/or authentication information, such as an international mobile subscriber identity (IMSI) and/or IMSI-related key(s). Further, the apparatus 702 may include one or more of an application processor 706 coupled to a secure digital (SD) card 708 and a screen 710, a Bluetooth module 712, a wireless local area network (WLAN) module 714, a Global Positioning System (GPS) module 716, and/or a power supply 718.

The cellular baseband processor 704 communicates through the cellular RF transceiver 722 with the TRP 180' and/or base station 102/180. The cellular baseband processor 704 may include a computer-readable medium/memory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704.

In the context of FIG. 3, the cellular baseband processor 704 may be a component of the UE 350 and may include the memory 360 and/or at least one of the TX processor 368, the RX processor 356, and/or the controller/processor 359. In one configuration, the apparatus 702 may be a modem chip and/or may be implemented as the baseband processor 704, while in another configuration, the apparatus 702 may be the entire UE (e.g., the UE 350 of FIG. 3) and may include some or all of the abovementioned modules, components, and/or circuitry illustrated in the context of the apparatus 702. In one configuration, the cellular RF transceiver 722 may be implemented as at least one of the transmitter 354TX and/or the receiver 354RX.

The reception component 730 may be configured to receive signaling on a wireless channel, such as signaling from a TRP 180 or TRP 180". The transmission component 734 may be configured to transmit signaling on a wireless channel, such as signaling to a base station or TRP 180 or TRP 180". The communication manager 732 may coordinate or manage some or all wireless communications by the apparatus 702, including across the reception component 730 and the transmission component 734.

The reception component 730 may provide some or all data and/or control information included in received signaling to the communication manager 732, and the communication manager 732 may generate and provide some or all of the data and/or control information to be included in transmitted signaling to the transmission component 734. The communication manager 732 may include the various illustrated components, including one or more components configured to process received data and/or control information, and/or one or more components configured to generate data and/or control information for transmission.

The communication manager 732 may include, inter alia, a mapping identification component 740, a TRP identification component 742, a beam activation component 744, and a communication component 746. One or more of the foregoing components may communicate with the reception component 730 and/or the transmission component 734.

The reception component 730 may be configured to receive first control information indicating at least one beam associated with a plurality of CCs, e.g., as described in connection with 502 of FIG. 5. The reception component 730 may receive the first control information via RRC signaling. The first control information may indicate a number of pool indexes associated with at least one CORESET, which may be a pool of resources in which the CORESET may be found and/or may indicate a mapping between an activated TCI state (e.g., beam) and a codepoint specific to the CORESET. The information associated with the CORESET may indicate zero, one, or more than one pool indexes associated with a CORESET of each CORESET of the set.

The reception component 730 may be further configured to second control information indicating a set of codepoints associated with at least one respective TCI state ID included in third control information, e.g., as described in connection with 504 of FIG. 5. For example, the second control information may indicate a mapping of a set of codepoints to a set of IDs (e.g., TCI state IDs) corresponding with a set of beams. The second control information may be received in at least one MAC CE.

The reception component 730 may be configured to receive information indicating a beam associated with communication on a plurality of CCs, e.g., as described in connection with 506 of FIG. 5. For example, the first and second control information may configure the apparatus 702 to receive DCI in a first set of CORESET, and the reception component 730 may then receive information updating where a DCI location. In one aspect, the information indicating the beam associated with the communication on the plurality of CCs may be information indicating a set of beams associated with a set of CCs. The information may be configured by a base station, e.g., for carrier aggregation on multiple CCs provided through multiple beams.

The mapping identification component 740 may be configured to determine whether less than two (i.e., zero or one) pool indexes associated with a CORESET are configured for each of the set of CORESET, e.g., as described in connection with 510 of FIG. 5. The mapping identification component 740 may calculate, e.g., from the first control information, a number of pool indexes for a CORSET, and the mapping identification component 740 may compare that number with a threshold of one (1) to determine whether the number is less than two.

The mapping identification component 740 may be further configured to determine whether each codepoint in the second control information is associated with a single TCI state ID of third control information, e.g., as described in connection with 512 of FIG. 5. For example, the mapping identification component 740 may determine whether one or two TCI state IDs are mapped to a single codepoint. The mapping identification component 740 may calculate, e.g., from the second control information, a number of TCI state IDs to which each code point maps, and the mapping identification component 740 may compare that number with a threshold equal to one (1) to determine whether the number of IDs to which a codepoint maps is less than two.

The TRP identification component 742 may be configured to determine whether a single TRP or mTRP 180', 180" is configured for the communication on the plurality of CCs, e.g., as described in connection with 508 of FIG. 5. For example, if any of the codepoints is mapped to more than one beam, then the TRP identification component 742 may determine that mTRP 180', 180" are configured for the apparatus 702. Similarly, if each CORESET is configured with at most one pool index, then the TRP identification component 742 may determine that sTRP 180' is configured for the apparatus 702. If the TRP identification component 742 determines either of the preceding conditions is false—i.e., if one codepoint is mapped to more than one TCI state ID and/or if one CORESET is configured with more than one pool index—then the TRP identification component 742 may determine that mTRP 180', 180" are configured for the apparatus 702.

The beam activation component 744 may be configured to apply the beam for the communication with sTRP on the plurality of CCs when less than two TCI state IDs are mapped to a single codepoint and less than two pool indexes are configured for a CORESET, e.g., as described in connection with 514 of FIG. 5. That is, the beam activation component 744 may activate the set of beams on the plurality of CCs either for sTRP 180' or for mTRP 180', 180", the set of beams being activated for the sTRP 180' when less than two beam IDs respectively associated with the set of beams are mapped to a codepoint and less than two pool indexes are configured for a CORESET associated with at least one CC of the plurality of CCs. In some aspects, applying and/or activating a beam may include, identifying at least one pilot signal that is QCL with the beam, measuring or detecting one or more parameters associated with the pilot signals, and selecting a spatial filter for the beam that steers the beam in a direction that is substantially similar to that of the QCL pilot signal.

In some aspects, the communication component 746 may be configured to communicate on at least one of the plurality of CCs with the sTRP 180' via the applied beam, e.g., as described in connection with 516 of FIG. 5. In some aspects, the communication component 746 may receive (through the reception component 730) downlink data or control information on the at least one of the plurality of CCs from the sTRP 180' via the applied beam. For example, the communication component 746 detect signaling on the PDCCH CORESET of one of the plurality of CCs for the sTRP 180'. The communication component 746 may decode the signaling carried thereon in order to obtain DCI, which may schedule downlink data on a PDSCH from the sTRP 180'. The communication component 746 may then use the schedule to receive the downlink data on the PDSCH from the sTRP 180'.

In some other aspects, when the beam activation component 744 applies or activates the beam on one of the plurality of CCs for the mTRP 180', 180", the communication component 746 may be configured to sound the uplink channel. Accordingly, the communication component 746 may transmit (through the transmission component 734) a set of SRSs on at most one of the plurality of CCs for each TRP of the mTRP 180', 180" via the beam.

In some aspects, the beam activation component 744 may apply the beam for the communication with each of the mTRP 180', 180" on only one CC of the plurality of CCs. In some aspects, the communication component 746 may be configured to communicate on at most one of the plurality of CCs with each TRP of the mTRP 180', 180" via the applied beam, e.g., as described in connection with 520 of FIG. 5. In some aspects, when the beam activation component 744 applies or activates the beam on one of the plurality of CCs for one TRP of the mTRP 180', 180", the communication component 746 may receive (through the reception component 730) downlink data or control information on the one of the plurality of CCs from the one TRP of the mTRP 180', 180" via the applied beam. For example, the communication component 746 detect signaling on the PDCCH CORESET of one of the plurality of CCs for one TRP of the mTRP 180', 180". The communication component 746 may decode the signaling carried thereon in order to obtain DCI, which may schedule downlink data on a PDSCH in the one CC associated with the one TRP. The communication component 746 may then use the schedule to receive the downlink data on the PDSCH from the one of the mTRP 180', 180".

In some other aspects, when the beam activation component 744 applies or activates the beam on one of the plurality of CCs for the mTRP 180', 180", the communication component 746 may be configured to sound the uplink channel. Accordingly, the communication component 746 may transmit (through the transmission component 734) a set of SRSs on at most one of the plurality of CCs for each TRP of the mTRP 180', 180" via the beam.

The apparatus 702 may include additional components that perform some or all of the blocks, operations, signaling, etc. of the algorithm(s) in the aforementioned call flow diagram(s) and/or flowchart(s) of FIGS. 4 and 5. As such, some or all of the blocks, operations, signaling, etc. in the aforementioned call flow diagram(s) and/or flowchart(s) of FIGS. 4 and 5 may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving information indicating a set of beams associated with a plurality of CCs; and means for activating the set of beams on the plurality of CCs either for a single sTRP or for mTRP, the set of beams being activated for the sTRP when less than two beam IDs respectively associated with the set of beams are mapped to a codepoint and less than two pool indexes are configured for a CORESET associated with at least one CC of the plurality of CCs.

In one configuration, the set of beams is activated for the mTRP when at least one of: the codepoint is mapped to two or more beam IDs, or the CORESET either is configured with two or more pool indexes or is not configured with a pool index.

In one configuration, the means for activating the set of beams is configured to: activate either at least one of the set of beams on at least two of the plurality of CCs for the sTRP or each of the set of beams on at most one of the plurality of CCs for the mTRP.

In one configuration, the apparatus 702, and in particular the cellular baseband processor 704, may further include means for receiving, separately from the information indicating the set of beams associated with the plurality of CCs, at least one MAC CE indicating a mapping of each of a set of codepoints to a respective set of beam IDs; and means for identifying a beam of the set of beams based on the mapping of each of the set of codepoints to the respective set of beam IDs.

In one configuration, the apparatus 702, and in particular the cellular baseband processor 704, may further include means for receiving, separately from the information indicating the set of beams associated with the plurality of CCs, at least one RRC message indicating a pool index configured for the CORESET; and means for identifying, on one of the plurality of CCs, the CORESET associated with the sTRP for which the beam is activated based on the pool index and based on the codepoint.

In one configuration, the apparatus 702, and in particular the cellular baseband processor 704, may further include means for decoding information on either at least one of the plurality of CCs associated with the CORESET for the sTRP or on at least two of the CCs respectively associated with at least two of the plurality of CCs for at least two TRPs of the mTRP.

In one configuration, the apparatus 702, and in particular the cellular baseband processor 704, may further include means for transmitting a set of SRS on at least one of the plurality of CCs either to the sTRP via at least one of the set of beams, or to the mTRP via the set of beams.

In one configuration, the apparatus 702, and in particular the cellular baseband processor 704, may further include means for receiving downlink data or control information on the plurality of CCs either from the sTRP via at least one of the set of beams, or from the mTRP via each of the set of beams.

In one configuration, the information indicating the set of beams associated with the plurality of CCs is included in at least one of DCI or a MAC CE.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
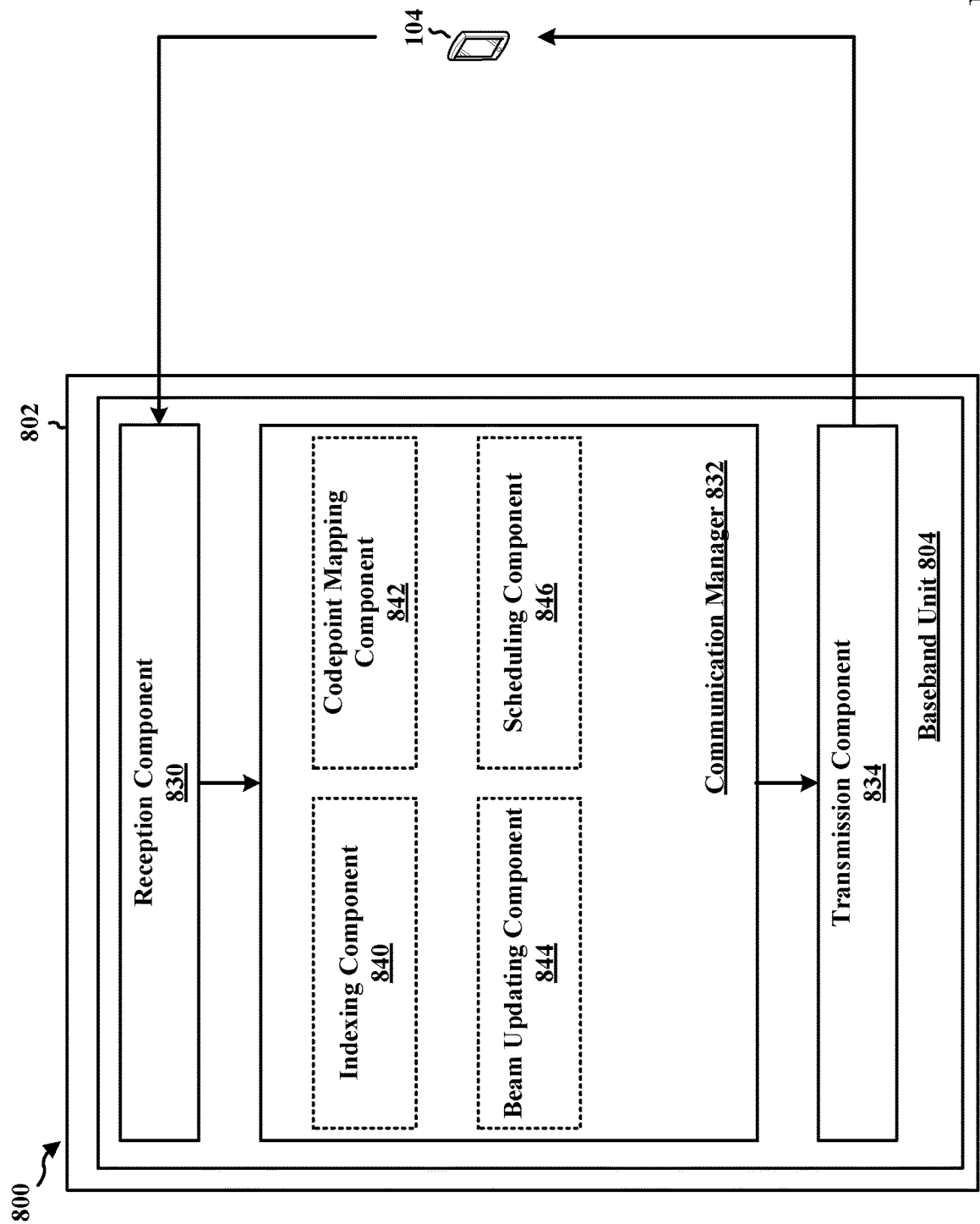
FIG. 8 is a diagram illustrating another example of a hardware implementation for another example apparatus.

FIG. 8 is a diagram 800 illustrating an example of a hardware implementation for an apparatus 802. The apparatus 802 may be a base station or similar device or system, or the apparatus 802 may be a component of a base station or similar device or system. The apparatus 802 may include a baseband unit 804. The baseband unit 804 may communicate through a cellular RF transceiver. For example, the baseband unit 804 may communicate through a cellular RF transceiver with a UE 104, such as for downlink and/or uplink communication, and/or with a TRP or other base station, such as for IAB.

The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the base station 310 and may include the memory 376 and/or at least one of the TX processor 316, the RX processor 370, and the controller/processor 375.

The reception component 830 may be configured to receive signaling on a wireless channel, such as signaling from a UE 104 or TRP (e.g., sTRP or mTRP). The transmission component 834 may be configured to transmit signaling on a wireless channel, such as signaling to a UE 104 or TRP. The communication manager 832 may coordinate or manage some or all wireless communications by the apparatus 802, including across the reception component 830 and the transmission component 834.

The reception component 830 may provide some or all data and/or control information included in received signaling to the communication manager 832, and the communication manager 832 may generate and provide some or all of the data and/or control information to be included in transmitted signaling to the transmission component 834. The communication manager 832 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 832 includes an indexing component 840, a codepoint mapping component 842, a beam updating component 844, and a scheduling component 846. One or more of the preceding components may be configured to transmit and/or receive signaling though the transmission component 834 and the reception component 830, respectively.

The indexing component 840 may configure a respective CORESET for each CC/BWP assigned to the UE 104 in a group of CCs, e.g., as described in connection with 602 of FIG. 6. First, the indexing component 840 may activate a BWP, and second, the indexing component 840 may select a set of resources to carry the PDCCH. The indexing component 840 may also select an aggregation level.

The codepoint mapping component 842 may configure a set of codepoints associated with at least one respective TCI state ID included in other control information for the UE 104, e.g., as described in connection with 604 of FIG. 6. For example, the codepoint mapping component 842 may identify a set of TCI states that have been activated, and the codepoint mapping component 842 may map an ID of each of the TCI states to a codepoint for a CORESET.

In some aspects, the indexing component 840 may configure one or more pool indexes for the CORESET, e.g., based on a codepoint. A pool index may indicate a mapping between the activated TCI states (e.g., beams) and the codepoint (e.g., in DCI) specific to the CORESET. A pool index may be configured to be one (1) to indicate application for a downlink transmission scheduled by a CORESET with the CORESET pool ID equal to one (1). In some other aspects, the pool index is not configured for any CORESET.

The transmission component 834 may transmit, to the UE 104, first control information indicating the set of CORESET, e.g., as described in connection with 606 of FIG. 6. The first information may indicate a set of pool indexes for each of a set of CORESETs. The transmission component 834 may transmit the first control information via RRC signaling.

The transmission component 834 may transmit, to the UE 104, second control information indicating the set of codepoints associated with the at least one respective TCI state ID included in the other control information, e.g., as described in connection with 608 of FIG. 6. The transmission component 834 may transmit the second control information in at least one MAC CE, and the other control information may be DCI. The second control information may indicate a respective subset of a set of beams to which each codepoint corresponds.

The beam updating component 844 may determine whether a single TRP or mTRP is to be configured for communication by the UE 104 on a plurality of CCs assigned to the UE 104, e.g., as described in connection with 610 of FIG. 6. For example, the beam updating component 844 may determine if the UE 104 supports carrier aggregation, as well as whether another TRP is available to provide a set of CCs to assign to the UE 104 for carrier aggregation. If the beam updating component 844 determines that the UE 104 does not support carrier aggregation and/or no TRPs are available to provide CCs for carrier aggregation, the beam updating component 844 may assign sTRP to the UE 104 for a plurality of CCs. If sTRP is configured, then the indexing component 840 may configure less than two (i.e., zero or one) pool indexes associated with a CORESET for each of the set of CORESET indicated in the first control information and, further, may configure each codepoint in the second control information to map to a single TCI state ID of activated beams.

The beam updating component 844, if sTRP is configured, may configure a beam for the communication by the UE 104 on the plurality of CCs, e.g., as described in connection with 612 of FIG. 6. For example, the beam updating component 844 may configure a group CC-based beam update. The beam updating component 844 may identify a set of resources on which the CORESET may be found, and the beam updating component 844 may select a beam to transmit the set of resources toward the UE 104. In some aspects, the beam updating component 844 may configure the beam by identifying a plurality of candidate beams available for communication with the UE 104, and the beam updating component 844 may compare respective wireless channel measurements corresponding to two or more of the plurality of beams with one another in order to identify the best serving beam for the UE 104. In some other aspects, the beam updating component 844 may configure the beam by identifying a position or location of the UE 104, which may be relative to the sTRP, and then selecting a beam having a direction toward the UE 104 position or location.

The scheduling component 846 may, if the sTRP is configured, allocate resources for communication with the UE 104 by the sTRP on at least one CC of the plurality of CCs, e.g., as described in connection with 614 of FIG. 6. For example, the scheduling component 846 may schedule or allocate a first set of resources on a downlink data channel to carry downlink data for the UE 104, and the scheduling component 846 may schedule or allocate a second set of resources on a downlink control channel to carry DCI that informs a UE 104 of the scheduling of the downlink data.

The beam updating component 844 may configure a beam for the communication by the UE 104 on one of the plurality of CCs with one TRP of mTRP, e.g., as described in connection with 616 of FIG. 6. For example, the beam updating component 844 may configure an update for each CC of the plurality of CCs on which a respective beam may be configured, with a respective one of the plurality of CCs being available through one of the TRPs. For example, the beam updating component 844 may identify a set of resources on which the CORESET may be found for each CC of the set of CCs, and the beam updating component 844 may select a beam to transmit the set of resources toward the UE 104. In some aspects, the beam updating component 844 may configure the beam by identifying a plurality of beams at mTRP available for communication with the UE 104, and the beam updating component 844 may compare wireless channel measurements respectively corresponding to the plurality of beams in order to determine which of the plurality of beams provides the best channel quality (e.g., the highest channel measurement). The beam updating component 844 may select the beam having the best channel quality with which to configure the UE 104 for communication on one CC of the plurality of CCs. In some other aspects, the beam updating component 844 may configure the beam by identifying a position or location of the UE 104, which may be relative to one TRP of the mTRP, and then selecting a beam of the one TRP having a direction toward the UE 104 position or location.

The scheduling component 846 may, if the mTRP is configured, allocate resources for communication with the UE 104 by each of at least two TRPs of the mTRP respectively on at most one CC of the plurality of CCs, e.g., as described in connection with 618 of FIG. 6. For example, the scheduling component 846 may schedule or allocate a first set of resources on a downlink control channel on one CC to carry first DCI of one TRP for the UE 104, and allocate a second set of resources on a downlink control channel on another CC to carry second DCI of another TRP for the UE 104. The scheduling component 846 may also allocate a third set of resources on a downlink data channel on the one CC to carry first downlink data of the one TRP for the UE 104, and allocate a fourth set of resources on a downlink data channel on the other CC to carry second downlink data of the other TRP for the UE 104. The first DCI may be configured to indicate a schedule of the first downlink data on the downlink control channel of the one CC, and the second DCI may be configured to indicate a schedule of the second downlink data on the downlink control channel of the other CC.

The transmission component 834 may be configured to transmit information indicating the beam to the UE 104, e.g., as described in connection with 620 of FIG. 6. The information indicating the beam may be included in at least one MAC CE. In some aspects, the information may configure the UE 104 for directional beamforming on one or more CCs on which a CORESET may be found. In some other aspects, the UE 104 may sound over at least one of the CCs using the beam. For example, the UE 104 may transmit uplink SRSs via the beam toward at least one the apparatus 802 on at least one of the CCs.

The apparatus 802 may include additional components that perform some or all of the blocks, operations, signaling, etc. of the algorithm(s) in the aforementioned call flow diagram(s) and/or flowchart(s) of FIGS. 4 and 6. As such, some or all of the blocks, operations, signaling, etc. in the aforementioned call flow diagram(s) and/or flowchart(s) of FIGS. 4 and 6 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for configuring a set of beams on a plurality of component carriers (CCs) either for a sTRP or for mTRP, the set of beams being configured for the sTRP when less than two beam IDs respectively associated with the set of beams are mapped to a codepoint and less than two pool indexes are configured for a CORESET associated with at least one CC of the plurality of CCs; and means for transmitting, to a UE, information indicating the set of beams associated with the plurality of CCs.

In one configuration, the set of beams is configured for the mTRP with at least one of: the codepoint being mapped to two or more beam IDs, or the CORESET either is configured with two or more pool indexes or is not configured with a pool index.

In one configuration, the means for configuring the set of beams is configured to configure either at least one of the set of beams on at least two of the plurality of CCs for the sTRP or each of the set of beams on at most one of the plurality of CCs for the mTRP.

In one configuration, the apparatus 802, and in particular the baseband unit 804, may further include means for mapping each of a set of codepoints to a respective set of beam IDs; and means for transmitting, separately from the information indicating the set of beams associated with the plurality of CCs, at least one MAC CE indicating the set of codepoints mapped to the respective set of beam IDs.

In one configuration, the apparatus 802, and in particular the baseband unit 804, may further include means for configuring a pool index for the CORESET based on the codepoint; and means for transmitting, separately from the information indicating the set of beams associated with the plurality of CCs, at least one RRC message indicating the pool index configured for the CORESET.

In one configuration, the apparatus 802, and in particular the baseband unit 804, may further include means for receiving a set of SRS on at least one of the plurality of CCs from the UE based on the information indicating the set of beams associated with the plurality of CCs.

In one configuration, the apparatus 802, and in particular the baseband unit 804, may further include means for transmitting, to the UE, downlink data or control information on at least one of the plurality of CCs based on the information indicating the set of beams associated with the plurality of CCs.

In one configuration, the information indicating the set of beams associated with the plurality of CCs is included in at least one of DCI or a MAC CE.

The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, the specific order or hierarchy of blocks in the processes/flowcharts will be understood to have the potential to be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 may be a method at a UE, including: receiving information indicating a set of beams associated with a plurality of CCs; and activating the set of beams on the plurality of CCs either for a sTRP or for mTRP, the set of beams being activated for the sTRP when less than two beam IDs respectively associated with the set of beams are mapped to a codepoint and less than two pool indexes are configured for a CORESET associated with at least one CC of the plurality of CCs.

Example 2 may include the method of Example 1, wherein the set of beams is activated for the mTRP when at least one of: the codepoint is mapped to two or more beam IDs, or the CORESET either is configured with two or more pool indexes or is not configured with a pool index.

Example 3 may include the method of Example 1, wherein the activating the set of beams includes: activating either at least one of the set of beams on at least two of the plurality of CCs for the sTRP or each of the set of beams on at most one of the plurality of CCs for the mTRP.

Example 4 may include the method of Example 1, further including: receiving, separately from the information indicating the set of beams associated with the plurality of CCs, at least one MAC CE indicating a mapping of each of a set of codepoints to a respective set of beam IDs; and identifying a beam of the set of beams based on the mapping of each of the set of codepoints to the respective set of beam IDs.

Example 5 may include the method of Example 4, further including: receiving, separately from the information indicating the set of beams associated with the plurality of CCs, at least one RRC message indicating a pool index configured for the CORESET; and identifying, on one of the plurality of CCs, the CORESET associated with the sTRP for which the beam is activated based on the pool index and based on the codepoint.

Example 6 may include the method of Example 1, further including: decoding information on either at least one of the plurality of CCs associated with the CORESET for the sTRP or on at least two of the CCs respectively associated with at least two of the plurality of CCs for at least two TRPs of the mTRP.

Example 7 may include the method of Example 1, further including: transmitting a set of SRS on at least one of the plurality of CCs either to the sTRP via at least one of the set of beams, or to the mTRP via the set of beams.

Example 8 may include the method of Example 1, further including: receiving downlink data or control information on the plurality of CCs either from the sTRP via at least one of the set of beams, or from the mTRP via each of the set of beams.

Example 9 may include the method of Example 1, wherein the information indicating the set of beams associated with the plurality of CCs is included in at least one of DCI or a MAC CE.

Example 10 may be a method of wireless communication at a base station, including: configuring a set of beams on a plurality of CCs either for a sTRP or for mTRP, the set of beams being configured for the sTRP when less than two beam IDs respectively associated with the set of beams are mapped to a codepoint and less than two pool indexes are configured for a CORESET associated with at least one CC of the plurality of CCs; and transmitting, to a UE, information indicating the set of beams associated with the plurality of CCs.

Example 11 may include the method of Example 10, wherein the set of beams is configured for the mTRP with at least one of: the codepoint being mapped to two or more beam IDs, or the CORESET either is configured with two or more pool indexes or is not configured with a pool index.

Example 12 may include the method of Example 10, wherein the configuring the set of beams includes: configuring either at least one of the set of beams on at least two of the plurality of CCs for the sTRP or each of the set of beams on at most one of the plurality of CCs for the mTRP.

Example 13 may include the method of Example 10, further including: mapping each of a set of codepoints to a respective set of beam IDs; and transmitting, separately from the information indicating the set of beams associated with the plurality of CCs, at least one MAC CE indicating the set of codepoints mapped to the respective set of beam IDs.

Example 14 may include the method of Example 10, further including: configuring a pool index for the CORESET based on the codepoint; and transmitting, separately from the information indicating the set of beams associated with the plurality of CCs, at least one RRC message indicating the pool index configured for the CORESET.

Example 15 may include the method of Example 10, further including: receiving a set of SRS on at least one of the plurality of CCs from the UE based on the information indicating the set of beams associated with the plurality of CCs.

Example 16 may include the method of Example 10, further including: transmitting, to the UE, downlink data or control information on at least one of the plurality of CCs based on the information indicating the set of beams associated with the plurality of CCs.

Example 17 may include the method of Example 10, wherein the information indicating the set of beams associated with the plurality of CCs is included in at least one of DCI or MAC CE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving information indicating a set of beams associated with a plurality of component carriers (CCs); and
    activating the set of beams on the plurality of CCs either for a single transmission reception point (TRP) (sTRP) or for multiple TRPs (mTRP), the set of beams being activated for the sTRP when less than two beam identifiers (IDs) respectively associated with the set of beams are mapped to a codepoint and less than two pool indexes are configured for a control resource set (CORESET) associated with at least one CC of the plurality of CCs, and the set of beams being activated for the mTRP when at least one of:
        the codepoint is mapped to two or more beam IDs, or
        the CORESET either is configured with two or more pool indexes or is not configured with a pool index.

2. The method of claim 1, wherein the activating the set of beams comprises:
    activating either at least one of the set of beams on at least two of the plurality of CCs for the sTRP or each of the set of beams on at most one of the plurality of CCs for the mTRP.

3. The method of claim 1, further comprising:
    receiving, separately from the information indicating the set of beams associated with the plurality of CCs, at least one medium access control (MAC) control element (CE) indicating a mapping of each of a set of codepoints to a respective set of beam IDs; and
    identifying a beam of the set of beams based on the mapping of each of the set of codepoints to the respective set of beam IDs.

4. The method of claim 3, further comprising:
    receiving, separately from the information indicating the set of beams associated with the plurality of CCs, at least one radio resource control (RRC) message indicating a pool index configured for the CORESET; and
    identifying, on one of the plurality of CCs, the CORESET associated with the sTRP for which the beam is activated based on the pool index and based on the codepoint.

5. The method of claim 1, further comprising:
    decoding information on either at least one of the plurality of CCs associated with the CORESET for the sTRP or on at least two of the CCs respectively associated with at least two of the plurality of CCs for at least two TRPs of the mTRP.

6. The method of claim 1, further comprising:
    transmitting a set of sounding reference signals (SRS) on at least one of the plurality of CCs either to the sTRP via at least one of the set of beams, or to the mTRP via the set of beams.

7. The method of claim 1, further comprising:
    receiving downlink data or control information on the plurality of CCs either from the sTRP via at least one of the set of beams, or from the mTRP via each of the set of beams.

8. The method of claim 1, wherein the information indicating the set of beams associated with the plurality of CCs is included in at least one of downlink control information (DCI) or a medium access control (MAC) control element (CE).

9. A method of wireless communication at a base station, comprising:
    configuring a set of beams on a plurality of component carriers (CCs) either for a single transmission reception point (TRP) (sTRP) or for multiple TRPs (mTRP), the set of beams being configured for the sTRP when less than two beam identifiers (IDs) respectively associated with the set of beams are mapped to a codepoint and less than two pool indexes are configured for a control resource set (CORESET) associated with at least one CC of the plurality of CCs, and the set of beams being configured for the mTRP with at least one of:
        the codepoint being mapped to two or more beam IDs, or
        the CORESET either is configured with two or more pool indexes or is not configured with a pool index; and
    transmitting, to a user equipment (UE), information indicating the set of beams associated with the plurality of CCs.

10. The method of claim 9, wherein the configuring the set of beams comprises:
    configuring either at least one of the set of beams on at least two of the plurality of CCs for the sTRP or each of the set of beams on at most one of the plurality of CCs for the mTRP.

11. The method of claim 9, further comprising:
    mapping each of a set of codepoints to a respective set of beam IDs; and
    transmitting, separately from the information indicating the set of beams associated with the plurality of CCs, at least one medium access control (MAC) control element (CE) indicating the set of codepoints mapped to the respective set of beam IDs.

12. The method of claim 9, further comprising:
    configuring a pool index for the CORESET based on the codepoint; and
    transmitting, separately from the information indicating the set of beams associated with the plurality of CCs, at least one radio resource control (RRC) message indicating the pool index configured for the CORESET.

13. The method of claim 9, further comprising:
    receiving a set of sounding reference signals (SRS) on at least one of the plurality of CCs from the UE based on the information indicating the set of beams associated with the plurality of CCs.

14. The method of claim 9, further comprising:
transmitting, to the UE, downlink data or control information on at least one of the plurality of CCs based on the information indicating the set of beams associated with the plurality of CCs.

15. The method of claim 9, wherein the information indicating the set of beams associated with the plurality of CCs is included in at least one of downlink control information (DCI) or a medium access control (MAC) control element (CE).

16. An apparatus for wireless communication at a user equipment (UE), comprising:
a memory; and
at least one processor coupled to the memory and configured to:
receive information indicating a set of beams associated with a plurality of component carriers (CCs); and
activate the set of beams on the plurality of CCs either for a single transmission reception point (TRP) (sTRP) or for multiple TRPs (mTRP), the set of beams being activated for the sTRP when less than two beam identifiers (IDs) respectively associated with the set of beams are mapped to a codepoint and less than two pool indexes are configured for a control resource set (CORESET) associated with at least one CC of the plurality of CCs, and the set of beams being activated for the mTRP when at least one of:
the codepoint is mapped to two or more beam IDs, or
the CORESET either is configured with two or more pool indexes or is not configured with a pool index.

17. The apparatus of claim 16, wherein the activation of the set of beams comprises to activate either at least one of the set of beams on at least two of the plurality of CCs for the sTRP or each of the set of beams on at most one of the plurality of CCs for the mTRP.

18. The apparatus of claim 16, wherein the at least one processor is further configured to:
receive, separately from the information indicating the set of beams associated with the plurality of CCs, at least one medium access control (MAC) control element (CE) indicating a mapping of each of a set of codepoints to a respective set of beam IDs; and
identify a beam of the set of beams based on the mapping of each of the set of codepoints to the respective set of beam IDs.

19. The apparatus of claim 18, wherein the at least one processor is further configured to:
receive, separately from the information indicating the set of beams associated with the plurality of CCs, at least one radio resource control (RRC) message indicating a pool index configured for the CORESET; and
identify, on one of the plurality of CCs, the CORESET associated with the sTRP for which the beam is activated based on the pool index and based on the codepoint.

20. The apparatus of claim 16, wherein the at least one processor is further configured to:
decode information on either at least one of the plurality of CCs associated with the CORESET for the sTRP or on at least two of the CCs respectively associated with at least two of the plurality of CCs for at least two TRPs of the mTRP.

21. The apparatus of claim 16, wherein the at least one processor is further configured to:
transmit a set of sounding reference signals (SRS) on at least one of the plurality of CCs either to the sTRP via at least one of the set of beams, or to the mTRP via the set of beams.

22. The apparatus of claim 16, wherein the at least one processor is further configured to:
receive downlink data or control information on the plurality of CCs either from the sTRP via at least one of the set of beams, or from the mTRP via each of the set of beams.

23. An apparatus for wireless communication at a base station, comprising:
a memory; and
at least one processor coupled to the memory and configured to:
configure a set of beams on a plurality of component carriers (CCs) either for a single transmission reception point (TRP) (sTRP) or for multiple TRPs (mTRP), the set of beams being configured for the sTRP when less than two beam identifiers (IDs) respectively associated with the set of beams are mapped to a codepoint and less than two pool indexes are configured for a control resource set (CORESET) associated with at least one CC of the plurality of CCs, and the set of beams being configured for the mTRP with at least one of:
the codepoint being mapped to two or more beam IDs, or
the CORESET either is configured with two or more pool indexes or is not configured with a pool index; and
transmit, to a user equipment (UE), information indicating the set of beams associated with the plurality of CCs.

24. The apparatus of claim 23, wherein the configuration of the set of beams comprises to configure either at least one of the set of beams on at least two of the plurality of CCs for the sTRP or each of the set of beams on at most one of the plurality of CCs for the mTRP.

25. The apparatus of claim 23, wherein the at least one processor is further configured to:
map each of a set of codepoints to a respective set of beam IDs; and
transmit, separately from the information indicating the set of beams associated with the plurality of CCs, at least one medium access control (MAC) control element (CE) indicating the set of codepoints mapped to the respective set of beam IDs.

26. The apparatus of claim 23, wherein the at least one processor is further configured to:
configure a pool index for the CORESET based on the codepoint; and
transmit, separately from the information indicating the set of beams associated with the plurality of CCs, at least one radio resource control (RRC) message indicating the pool index configured for the CORESET.

* * * * *